United States Patent
Key

(10) Patent No.: US 11,475,920 B2
(45) Date of Patent: *Oct. 18, 2022

(54) EMBEDDING INTERACTIVE CONTENT INTO A SHAREABLE ONLINE VIDEO

(71) Applicant: BON2 Media Services LLC, Miami Beach, FL (US)

(72) Inventor: Ntana Bantu Key, Miami Beach, FL (US)

(73) Assignee: BON2 MFDIA SERVICES LLC, Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,763

(22) Filed: Nov. 16, 2020

(65) Prior Publication Data
US 2021/0090609 A1     Mar. 25, 2021

Related U.S. Application Data

(63) Continuation of application No. 16/104,609, filed on Aug. 17, 2018, now Pat. No. 10,878,851.
(Continued)

(51) Int. Cl.
*G11B 27/036* (2006.01)
*G06F 3/0482* (2013.01)
(Continued)

(52) U.S. Cl.
CPC ......... *G11B 27/036* (2013.01); *G06F 3/0482* (2013.01); *G06F 16/738* (2019.01);
(Continued)

(58) Field of Classification Search
CPC ..... G11B 27/036; G11B 27/031; G11B 27/34; G06F 3/0482; G06F 16/738;
(Continued)

(56) References Cited

U.S. PATENT DOCUMENTS 5,826,102 A * 10/1998 Escobar ................. G11B 27/34
715/202
7,559,017 B2   7/2009 Datar et al.
(Continued)

OTHER PUBLICATIONS

International Search Report and Written Opinion, PCT/US2018/047000, dated Nov. 22, 2018.

*Primary Examiner* — Girumsew Wendmagegn
(74) *Attorney, Agent, or Firm* — Edlavitch Law PLLC

(57) ABSTRACT

Technologies for implementing embedding interactive content into a shareable online video. The technologies include an authoring tool including a graphical user interface (GUI). The tool can be used to input an edit decision list (EDL) file and a video file that has a video. The GUI can provide a view of specific scenes of the video according to the EDL file and the video file. The GUI can also provide interactive features. Through the GUI and/or the tool, a selection of a scene of the specific scenes can be inputted as well as a selection of an interactive feature from the interactive features can be inputted. Then, the tool can embed the selected interactive feature into the selected scene at a selected specific spatial location in the selected scene. The tool can also output the video file with the embedded interactive feature.

20 Claims, 36 Drawing Sheets

Related U.S. Application Data

(60) Provisional application No. 62/547,591, filed on Aug. 18, 2017.

(51) Int. Cl.
*G06F 16/74* (2019.01)
*G06F 16/738* (2019.01)
*H04N 21/472* (2011.01)
*H04N 21/8545* (2011.01)
*H04N 21/2743* (2011.01)
*H04N 21/845* (2011.01)
*H04N 21/258* (2011.01)

(52) U.S. Cl.
CPC ..... *G06F 16/743* (2019.01); *H04N 21/25866* (2013.01); *H04N 21/2743* (2013.01); *H04N 21/47205* (2013.01); *H04N 21/8456* (2013.01); *H04N 21/8545* (2013.01)

(58) Field of Classification Search
CPC ............ G06F 16/743; H04N 21/25866; H04N 21/2743; H04N 21/47205; H04N 21/8456; H04N 21/8545
See application file for complete search history.

(56) References Cited

U.S. PATENT DOCUMENTS

| | | | |
|---|---|---|---|
| 8,826,117 B1* | 9/2014 | Junee | ................... G06F 3/04847 715/230 |
| 2010/0037149 A1 | 2/2010 | Heath | |
| 2011/0052144 A1* | 3/2011 | Abbas | .............. H04N 21/23418 386/240 |
| 2017/0062016 A1* | 3/2017 | Samra | ..................... G06F 3/048 |

* cited by examiner

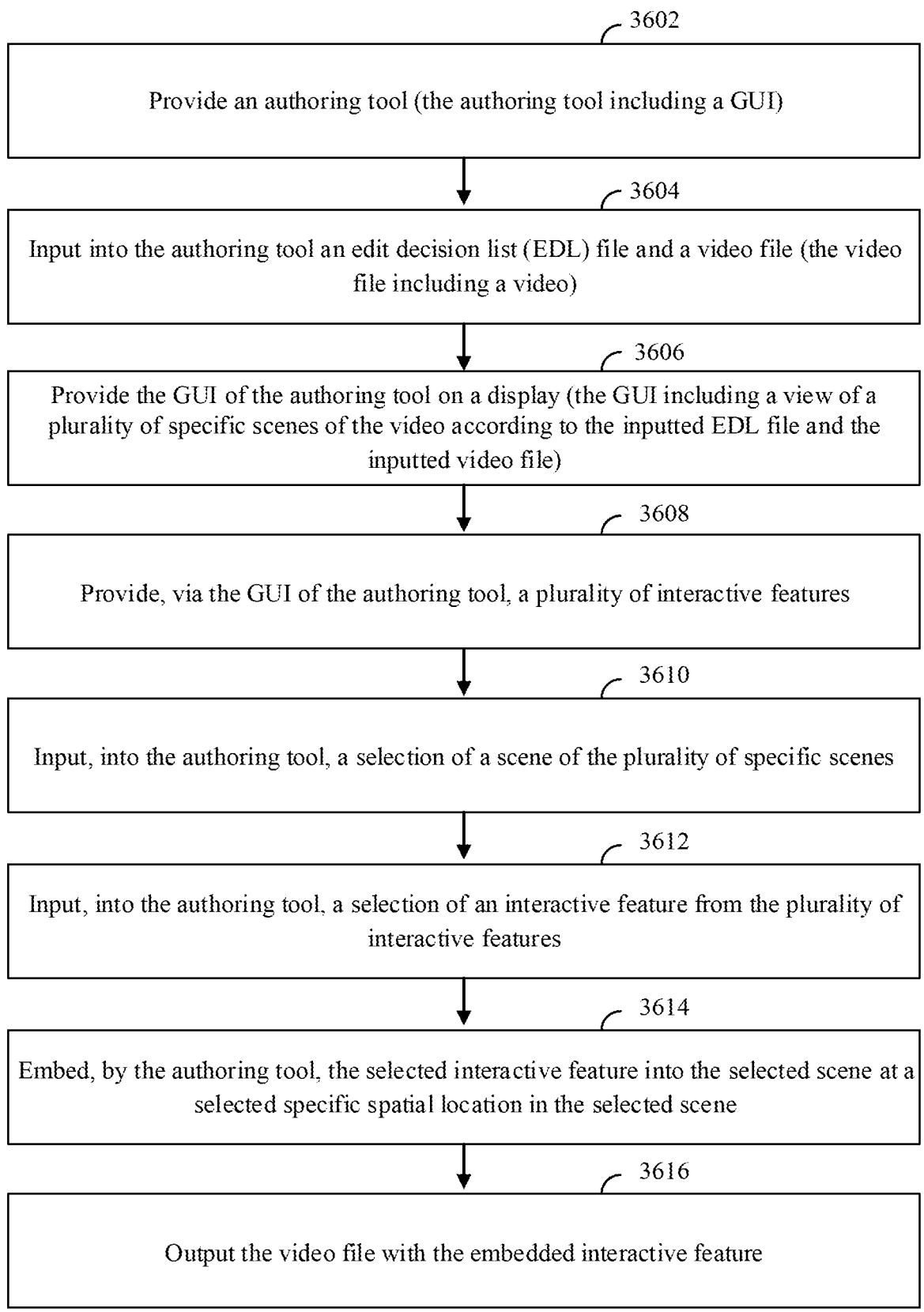

EMBEDDING INTERACTIVE CONTENT INTO A SHAREABLE ONLINE VIDEO

CROSS-REFERENCE TO RELATED APPLICATION

This application claims the benefit of priority from U.S. patent application Ser. No. 16/104,609, filed on Aug. 17, 2018, which is incorporated herein by reference in its entirety and which claims the benefit of priority from U.S. Provisional Patent Application No. 62/547,591, filed on Aug. 18, 2017, which is also incorporated herein by reference in its entirety).

FIELD

This disclosure generally relates to embedding interactive content into shareable online content. More specifically, this disclosure relates to embedding interactive content into shareable online music or videos.

BACKGROUND

Embedding interactive content into a shareable online video or an audio recording is well known. For over a decade, video with embedded interactive content has increased online. One reason for the increase in interactive content in online video may be the dramatic rise in users accessing the Internet. Also, the use of evolving interactive video applications may be responsible for the increase. Also, the growth of social networking platforms and Internet users' reluctance to pay for online content may have led to the significant increase in interactive video.

Embeddable interactive content can include clickable hotspots or video click throughs. WIREWAX has provided a platform for leveraging such technologies into music videos such that interactive embedded video content can present a way for viewers to discover additional information regarding people, places, and things occurring in a music video. Also, websites and media-sharing platforms such as YOUTUBE have added video annotation as an interactive layer embedded into online video. With such new technologies, online users can add interactive annotations to their videos in a simple way. Also, evolving from such technologies are new types of online videos such as choose-your-own-adventure video series, online video based video games, and animal-dubbing, just to name a few. Other innovations include the combination of social networking technologies with interactive videos.

With all the aforesaid growth, there are still many problems to overcome in the generation and distribution of interactive online videos and other forms of interactive online media such as interactive audio files. To put it another way, there is still much room for growth in this field of technology. Conventional ways of embedding interactive content into a shareable online video or audio can be clumsy and do not account for the dynamic nature of a video or an audio file. Also, known ways of embedding interactive content into a shareable online video are rigid with respect to precise temporal and spatial placement of interactive elements. In general, there is a need for fine-tuning interactive videos and perhaps audio files as well.

Specifically, there is a need to for fine-tuning interactive videos or audio files on a per scene or a cut-to-cut basis that is not overly complex and user friendly. It appears that none of the known online platforms for embedding interactive content into a shareable online video, such as platforms used by WIREWAX or YOUTUBE, provide a way to create, edit, and embed interactivity into online video or audio on a per scene basis, a cut-to-cut basis, or a frame-by-frame basis with consideration of specific spatial and temporal placement of interactive content. For example, it appears that online platforms do not provide a way of creating and embedding interactive content, wherein the end user controls the precise spatial and temporal placement of interactive video content. Providing such control over placement of interactive content would improve the clumsiness and impreciseness of conventional and known technologies.

For example, the known online platforms could be improved by providing an online application that give users control over specific spatial and temporal placement in a user-friendly way. However, the known platforms seem to fail to provide such features. Some known platforms provide an online application that can link embedded content to a determined group of pixels that identifies a person, place, or thing. The embedded content can move with the determined group of pixels in a video according to one or more algorithms. And, the determined group of pixels can change and adapt to the motion in a video. However, the adaptation can be clumsy due to the complexity of a video. More specifically, some of the algorithms allow embedded content to follow (or at least try to follow) the changing group of object-identifying pixels moving in a video. However, as it can be imagined, the algorithms for implementing such functionality is complex. And, because of the dynamic nature and complexity of video content, the results of the application can often be clumsy and imprecise.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed herein are user interfaces and techniques for embedding interactive content into a shareable online video in a precise and user-friendly way. And, with the disclosed technologies, an online end-user can control the specific spatial and temporal placement of interactive content in a video. Thus, the technical problems disclosed in the background section of this disclosure are overcome by the technical solutions described herein. Also, analogous techniques can be used for embedding interactive content into a shareable online audio file as well.

In some embodiments, at least one interactive feature is integrated into a specific sequence of video frames. The specific sequence of frames can be specific frames between two cuts that define the beginning and the end of the specific sequence of frames. In such embodiments, the at least one interactive feature is integrated into the specific sequence of video frames of an original video file to create an edited video file. And, such features can be controlled by the end-user in a precise and user-friendly way.

In some embodiments, at least some of the user interfaces and techniques described herein can be provided by an authoring tool. The authoring tool can be an online authoring tool implemented through a website. The authoring tool can be used for creating and editing interactive videos that are for postings on social media websites and other types of content-driven websites. The authoring tool can create interactive videos that allow users to discover people, places or things at any time within a video. The tool can be user friendly enough for amateur editors, but also provide sufficient functionality for professional video editors.

The authoring tool can be full featured or simplified for use on a mobile device, where screen size is limited. Edited interactive videos outputted by the authoring tool can be distributed via a website (such as a social media website) or as a downloadable application (such as a downloadable mobile application). The edited interactive videos can be edited music videos that are distributed to a music recognition social networking video player and editor. The authoring tool can allow a user to add an additional video sequence into a video file originated by the user as well as allow the inserting of interactive features into already existing sequences of video distributed by another user. This allows for adding creative content and tagging of friends and performers in the videos whether or not the video is originated by the user. The edited video can include a cameo of a friend that was not in the original video file or a tag for a performer in the original video. And, the tag or a visual element in the video can provide a link to additional information associated with the visual element or the tagged person, place or thing in the video.

In some embodiments, the systems and methods described herein can improve the speed in processing video, especially video with embedded interactive content. In such embodiments, the video is processed on a client device of a user, such as the author of the video. The video editing capability of the user's client device is connected to a centralized and/or remote server to provide a web interface for adding interactive content to a video. Then, the edited video can be uploaded to the server. The edited video with interactive features can then be played back on client devices. And, the distribution of the edited video to client devices can occur from the server. The server in such examples can include a group of interconnected servers.

Regarding one example general embodiment, this disclosure describes technologies for implementing embedding interactive content into a shareable online video. The technologies include an authoring tool including a graphical user interface (GUI). The tool can be used to input an edit decision list (EDL) file and a video file that has a video. The GUI can provide a view of specific scenes of the video according to the EDL file and the video file. The GUI can also provide interactive features. Through the GUI and/or the tool, a selection of a scene of the specific scenes can be inputted as well as a selection of an interactive feature from the interactive features can be inputted. Then, the tool can embed the selected interactive feature into the selected scene at a selected specific spatial location in the selected scene. The tool can also output the video file with the embedded interactive feature.

In accordance with one or more embodiments of the technologies, this disclosure provides computerized methods, systems, and a non-transitory computer-readable storage medium for implementing embedding interactive content into a shareable online video. The non-transitory computer-readable storage medium has tangibly stored thereon, or tangibly encoded thereon, computer readable instructions that when executed by one or more processors, or the like, cause at least one processor to perform a method for a novel and improved way of implementing embedding interactive content into a shareable online video. Also, in accordance with one or more embodiments of the technologies, functionality is embodied in steps of a method performed by at least one computing device. Also, in accordance with one or more embodiments of the technologies, program code (or program logic) executed by processor(s) of one or more computing devices can implement functionality in accordance with one or more embodiments described herein.

With regard to some more specific example embodiments, this disclosure describes a method of embedding interactive content into a shareable online video, the method including the steps of: providing an authoring tool on a computing device, the authoring tool including a graphical user interface (GUI); inputting into the authoring tool, by the computing device, an edit decision list (EDL) file and a video file, the video file including a video; providing the GUI of the authoring tool on a display communicatively coupled to the computing device, the GUI including a view of a plurality of specific scenes of the video according to the inputted EDL file and the inputted video file; providing, via the GUI of the authoring tool, a plurality of interactive features; inputting, into the authoring tool, a selection of a scene of the plurality of specific scenes; inputting, into the authoring tool, a selection of an interactive feature from the plurality of interactive features; embedding, by the authoring tool, the selected interactive feature into the selected scene at a selected specific spatial location in the selected scene; and outputting the video file with the embedded interactive feature.

In some embodiments, the method further includes the step of providing user account information, managed by a remote server, with the providing of the authoring tool. In such embodiments, the method further includes the step of communicating, by the computing device, the outputted video file with the embedded interactive feature to the remote server according to the user account information. In some embodiments, the method further includes the step of separating, by the computing device, the inputted video file into the plurality of scenes according to the inputted EDL file. In such embodiments, the method further includes the steps of inputting, by the authoring tool, a search query to a search engine; receiving, by the authoring tool, search results from the search engine according to the search query; and in response to receiving the search results, providing, via the GUI of the authoring tool, the plurality of interactive features which are based on the received search results. Also, the plurality of interactive features can be stored in the computing device. The selected interactive feature can include a static content addendum graphic and an additional feature associated with the selected interactive feature selected from the group consisting of a brief description, a detailed description, a website link, and a related image. The selected interactive feature can include a dynamic content addendum graphic and a visual transition that occurs upon activation of the selected interactive feature during playing of the video.

Both the foregoing summary and the following detailed description provide examples and are explanatory only. Accordingly, the foregoing summary and the following detailed description should not be considered to be restrictive. Further, features or variations can be provided in addition to those set forth herein.

BRIEF DESCRIPTION OF THE DRAWINGS

The present disclosure can be understood more fully from the detailed description given below and from the accompanying drawings.

FIG. 36 is a flowchart of another example method to implement embedding interactive content into a shareable online video in accordance with some embodiments of the present disclosure.

DESCRIPTION OF EMBODIMENTS

All illustrations of the drawings are for the purpose of describing selected versions of the present invention and are not intended to limit the scope of the present invention.

Figure 1:
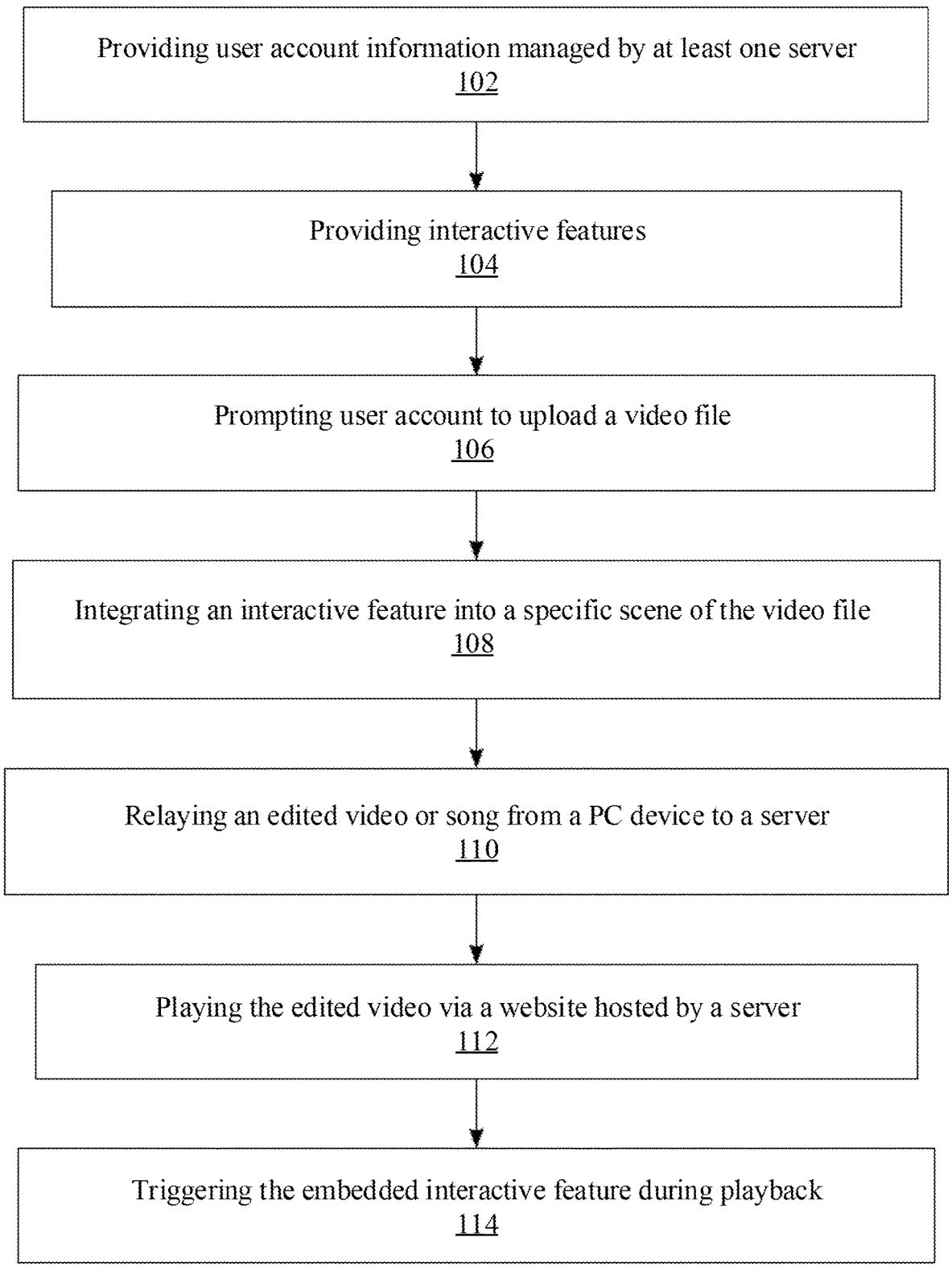
FIG. 1 is a flowchart of an example method to implement embedding interactive content into a shareable online video in accordance with some embodiments of the present disclosure.

FIG. 1 is a flowchart of an example method 100 to implement embedding interactive content into a shareable online video in accordance with some embodiments of the present disclosure. The interactive content can be used to present information on artists, users, and other people besides users and artists. The interactive content can also be used to present information on places and things. The information on people, places and things linked to the interactive content can be stored in data storage devices on a network such as the network 3400 depicted in FIG. 34. In some embodiments, the used network can include a network of devices supports a social network platform.

The method 100 includes at least one device, such as a server (e.g., one of the servers depicted in FIG. 34), providing user account information managed by at least one server (Step 102). The servers described herein can be remote serves. The user account information can be associated with a user account that can be associated with a personal computing (PC) device. In some embodiments, a PC device can be implemented by at least one of the client devices 3402 and 3404 of FIG. 34. The user account can also be created by the at least one server and that at least one server can be a remote server. More specifically, the user account can be managed by a plurality of remote servers internetworked together. In an example implementation, a PC device acts as a terminal computer allowing users to view and operate the user accounts hosted on one or more remote servers. The aforesaid remote server(s) can also host some of the aspects of the systems and methods described herein which is provided PC devices. Through the PC device, users can upload and download videos, audio, and applications hosted by servers. Such functionality of the PC device can be implemented through the authoring tool. The authoring tool can include a primary graphical user interface (GUI), such as primary GUI 300 depicted in FIGS. 3, 4, 6, 9-11, 13-15, 21, 23-25, 27-29, and 31. A PC device as herein referred to includes, but is not limited to, smartphones, laptops, desktop, PDAs, smartwatches, and the like. A PC device is a type of client device, and client devices are described herein in greater detail. For the purposes of this disclosure, it is to be understood that a PC device recited herein could be replaced by another type of client device with sufficient capabilities.

A server of the systems disclosed herein can utilize a plurality of user accounts to obtain, distribute, and present videos with interactive content amongst users associated with the server or an application or service served by the server. A user account is created through a user registration process. Through the process, a user can input a user name, a password, and an email address. The input for registration can be through a PC device. Personal information can also be provided via an existing social networking account such as a FACEBOOK or a GOOGLE account. Users can choose to open either a non-premium or a premium user account for using the products and services described herein. In some possible implementations, the premium user account affords users access to the authoring tool which allows users to embed interactive content into a user's videos or someone else's videos. Once the user creates the premium user account, the user can download the authoring tool into his or her own PC device.

The authoring tool is an interactive media authoring tool for professionals and amateur artists in the creative field or any person that wants to present added information with a video. The authoring tool can include a cut to cut or scene by scene timeline as well as timecoding. The authoring tool is able to import videos, edit decision list (EDL) files (also known as EDLs), and photos and audio. The videos, photos, and audio can be imported for commenting on, hash tagging, and embedding purposes such as links to additional corresponding information. In case a song, video, or other type of creative does not have user owned content or EDLs, the authoring tool can provide an overall suite of graphical user interfaces to create edit points. In the case of a song or a video file with audio and/or video content, the tool can create edit points based on video or song recognition technology (such as song recognition beats per minute (BPM) technology) and/or manual input by a user through graphical user interfaces of the tool.

The authoring tool allows users to embed interactive features into digital videos. A plurality of interactive features, stored on one or more devices (such as one or more PC device and a server), can be provided (Step 104).

In some embodiments, the plurality of interactive features is used to implement image tiles. Image tiles are interactive content that plays over a video when the video stops, loops, or a user moves a curser or pointer through the video. Image tiles can contain GPS data, data from the authoring tool, profile and video browsing data, comments, photos, loop data, like data, and looks data, for example. Image tiles are also where deep-linking occurs using links from content providers (such as from premium content holders) or for suggested content.

A user account of the system can be prompted by a server and/or client device to upload a video file (Step 106). In most embodiments, the file is uploaded by a PC device associated with the user account.

A video file includes a plurality of scenes. Scenes for the purpose of this disclosure can be or include a specific sequence of video frames (also referred to herein as a specific video sequence) or a set of specific sequences of video frames (also referred to herein as a specific set of video sequences). The scenes can also be further defined by cuts that border the beginning and the end of a scene. For example, beginning and ending cuts can border a specific video sequence or a specific set of video sequences. Also, a scene can be defined as the portion of video that plays or exits between edit points.

The authoring tool can use EDL files associated with a video file or song or video recognition technology to recognize and conform edit points of a recognized song or video file. A graphical user interface of the authoring tool which can be ran on a PC device can be used for integrating an interactive feature into a specific scene of the uploaded video file (Step 108). The interactive feature can be selected from the plurality of interactive features. The specific scene can be selected from a plurality of scenes. The at least one interactive feature can be used to create at least one image tile. And, the at least one interactive feature can also be embedded into an image tile, static and dynamic information that is merely viewable (and not interactive), and with links to further information on people, places and things.

In some embodiments, an interactive feature can be customized for a specific scene. For example, if the specific scene displays an actor or actress, the interactive feature can be an image tile showcasing a picture and an introduction of the actor or actress. In some examples, a scene of the plurality of scenes is integrated with a custom image tile relating to the people, place, or thing being shown in the scenes.

Also shown in FIG. 1, an edited video file can be transferred from the PC device to a server, such a remote server hosting one of the services or products described herein (Step 110). The edited video file includes at least one interactive feature with a specific scene. The edited video refers to the original video embedded with at least one interactive feature. A remote server of the system can distribute an edited video from a user account to one or more other accounts. Also, the edited video can be played with a video-sharing website hosted on a server of the system, which can be a remote server (Step 112).

Figure 2:
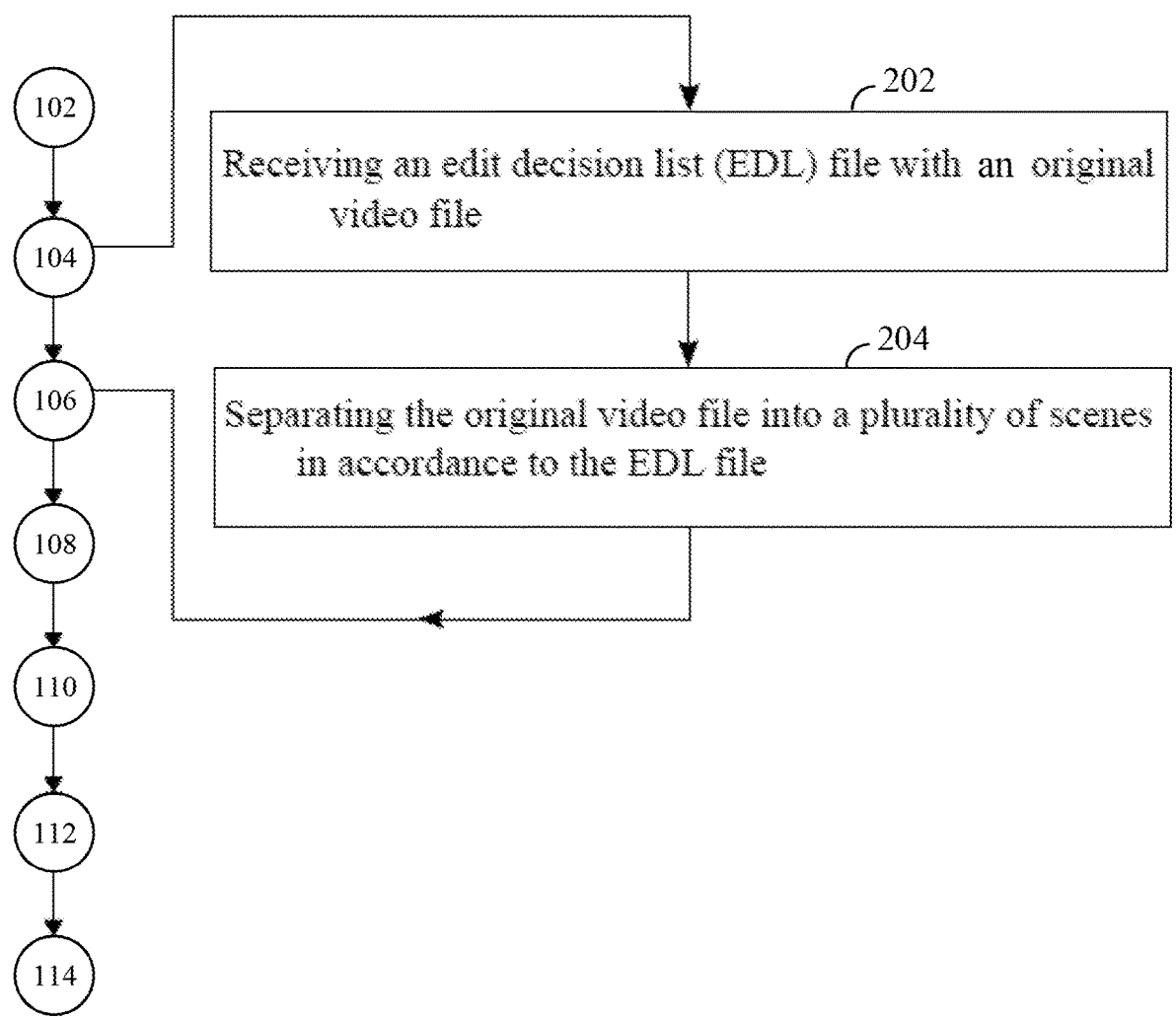
FIGS. 2, 5, 7, 8, 12, 16-20, 22, 26, 30, 32, and 33 are flowcharts of respective example methods combinable with the example method illustrated in FIG. 1.
Figure 3:
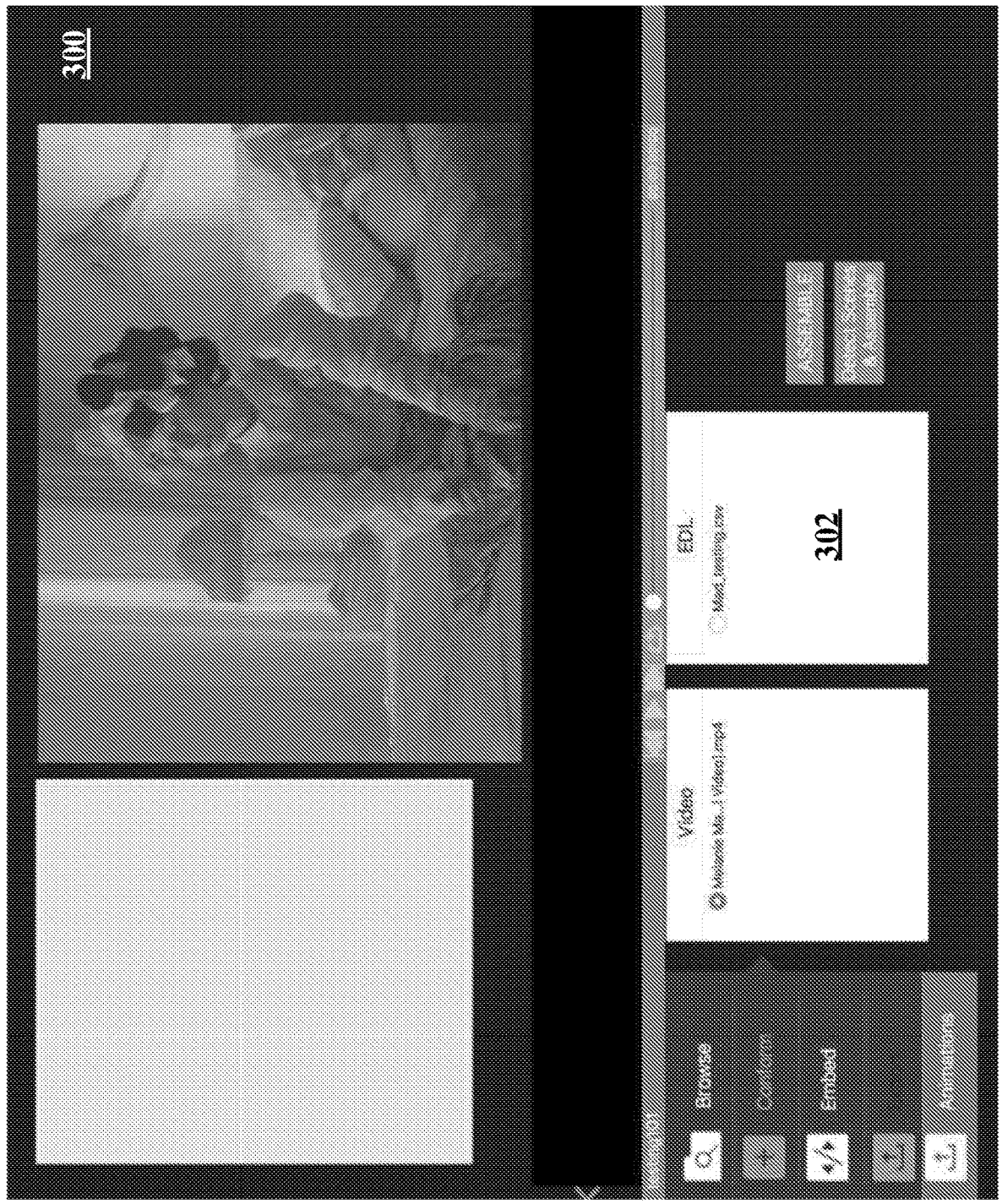
FIGS. 3, 4, 6, 9-11, 13-15, 21, 23-25, 27-29, and 31 are screenshots of example partial views of the authoring tool in accordance with some embodiments of the present disclosure.
Figure 4:
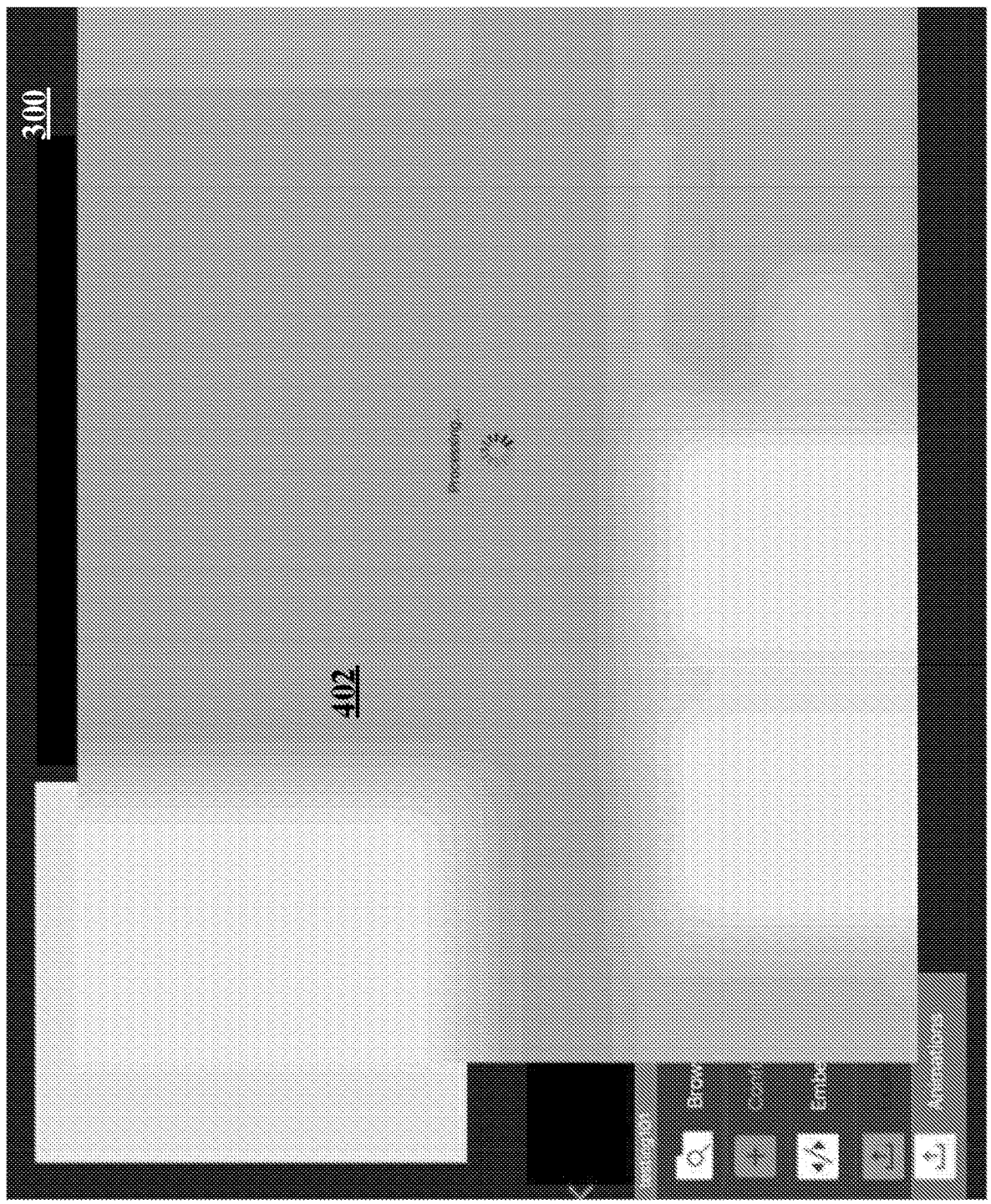

Referring to FIGS. 2-4, the authoring tool (which can be implemented via a website or a downloadable application) allows users to create, upload, share, and present interactive videos amongst each other. The flowchart of FIG. 2 illustrates processes for separating an original video of an original video file before interactive features can be added to it. In some embodiments, the processes for separating an original video use an EDL file as input for basing the separating of the video. The screenshot of FIG. 3 illustrates a way through a graphical user interface features of the primary GUI 300 to activate exporting of an EDL file for use with the authoring tool and/or a video playback application. For instance, EDL menu 302 provides a way to select and active of exporting an EDL file. The screenshot of FIG. 4 illustrates the authoring tool processing the EDL file for use with an original video. The GUI element 402 in the primary GUI 300 shows that the processing is occurring.

Also described herein is a novel online audio/video player and editor, herein referred to as the AV player-editor website. In some embodiments the AV player-editor website can include a social networking-based audio and video player and editor. And, in some even more specific embodiments, the AV player-editor website can include a music recognition social networking audio and video player and editor. The AV player-editor website can allow users to insert personal videos into their creative content videos or campaigns and tag friends to cameo in that video as well. This is achieved by recognizing the audio that users load with their content and instead of playing audio from the user's content, the AV player-editor website can play streaming music and stitch together video content for users to view.

The AV player-editor website displays the edited video into the feed of a user account. In some embodiments, the feed features the most popular edited videos submitted by users and unedited videos submitted by non-premium users. The feed can even be further prioritized by popular videos according to premium users. The feed can be displayed in a tile format with a tile displaying a single edited video. Clicking on the tile or simply hovering the cursor over the tile can play the edited video. Once the edited video starts playing, users can experience the embedded interactive features add through the authoring tool. A remote server can trigger the embedded interactive feature as the video-sharing website plays a specific scene with the embedded interactive feature (Step 114). Once the remote server triggers the interactive feature, the interactive feature is superimposed onto the specific scene.

In some embodiments, to determine a plurality of scenes, a PC device or a server receives an edit decision list (EDL) file with an original video file during Step 104 (Step 202). The EDL can be received by a PC device. The EDL files can be used in the post-production process of film editing and video editing. The EDL file contains an ordered list of reel and timecode data representing where one or more video clips can be obtained in order to conform the final cut. EDL files can be created by offline editing systems or can be paper documents constructed by hand such as shot logging. These days, linear video editing systems have been superseded by nonlinear editing (NLE) systems which can output EDL files electronically to allow the recreation of an edited program from the original sources (usually video tapes) and the editing decisions in the EDL file. Some formats, such as CMX3600, can represent simple editing decisions only. XML, the Advanced Authoring Format (AAF), and AviSynth scripts are relatively advanced file formats that have sophisticated abilities. The original video is usually accompanied with the EDL file containing information about the edit points and can be stored in the PC device. The original video file can be separated into a plurality of scenes in accordance to the EDL file (Step 204). The separation can be done with the PC device. The original video and the EDL file both can be uploaded into the authoring tool to generate the plurality of scenes. Also, for the purposes of this disclosure, it is to be understood that the EDL file is just one example technology that can be a basis for the separation of the video to be edited. Other technologies as be used as well, such as a CSV file and technologies that can use CSV files to separate files into selected parts.

In some embodiments, a video can be inputted with an EDL file or CSV file into the authoring tool and instructions on the backend of the tool converts the video to an edited video with embedded interactive content. Also, to provide video players with the capability of interpreting the way in which the embedded interactive content is positioned spatially and temporally within the edited video for playback, a corresponding instructional file can be outputted too, which is either a part of the edited video (such as in the header of the video file) or distributed and associated with the video file. The instructional file can be or include a JavaScript Object Notation (JSON) file or another type of file that uses human-readable text to transmit data objects consisting of attribute-value pairs and array data types (or any other serializable value). Also, the instructional file can include a data format used for asynchronous client-server communications. Also, the instructional file can be based on XML, and related technologies. Either way, AV player-editor website is configured to receive and process the edited video file and the instructional file for playing of the edited video file such that the video is rendered with the embedded interactive content.

Figure 5:
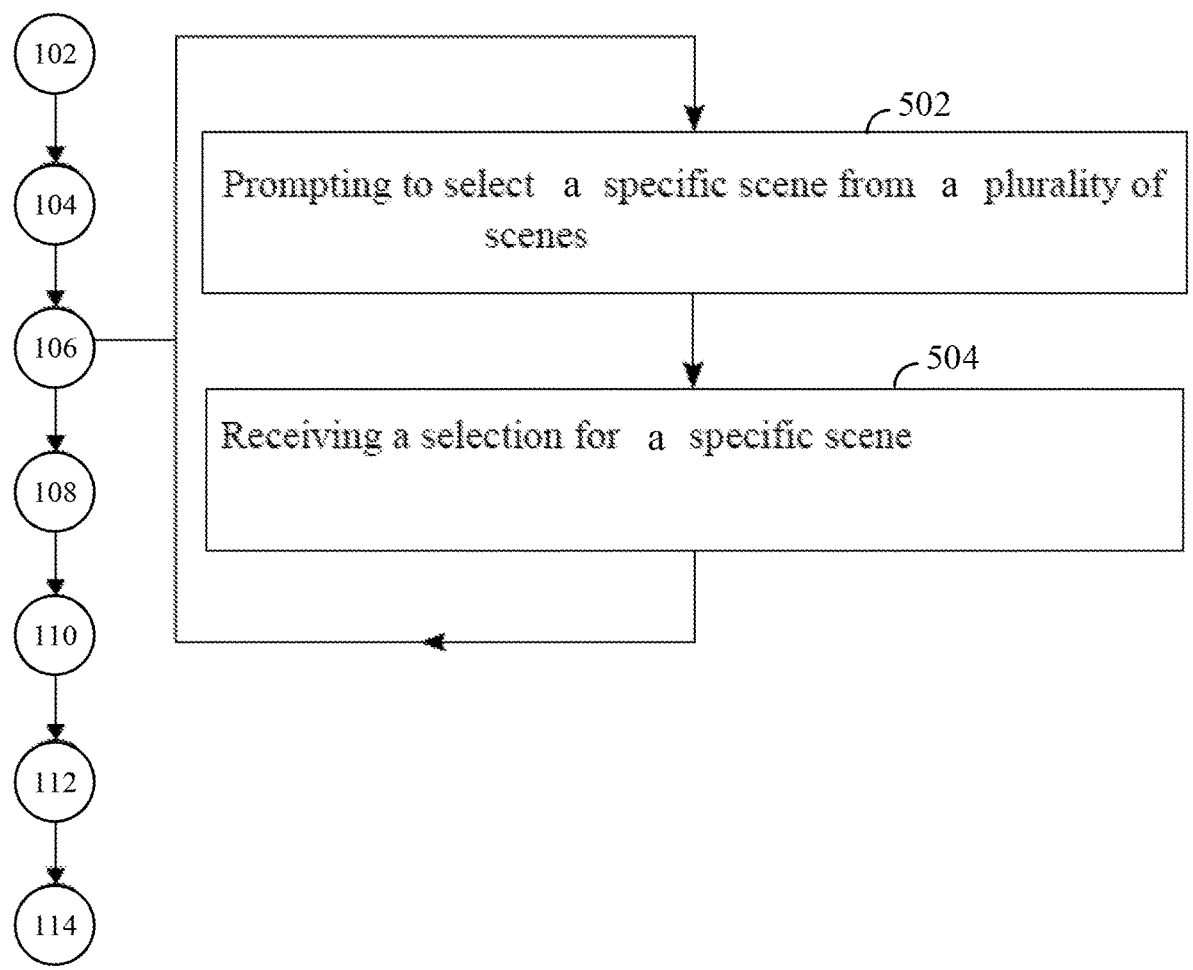
Figure 6:
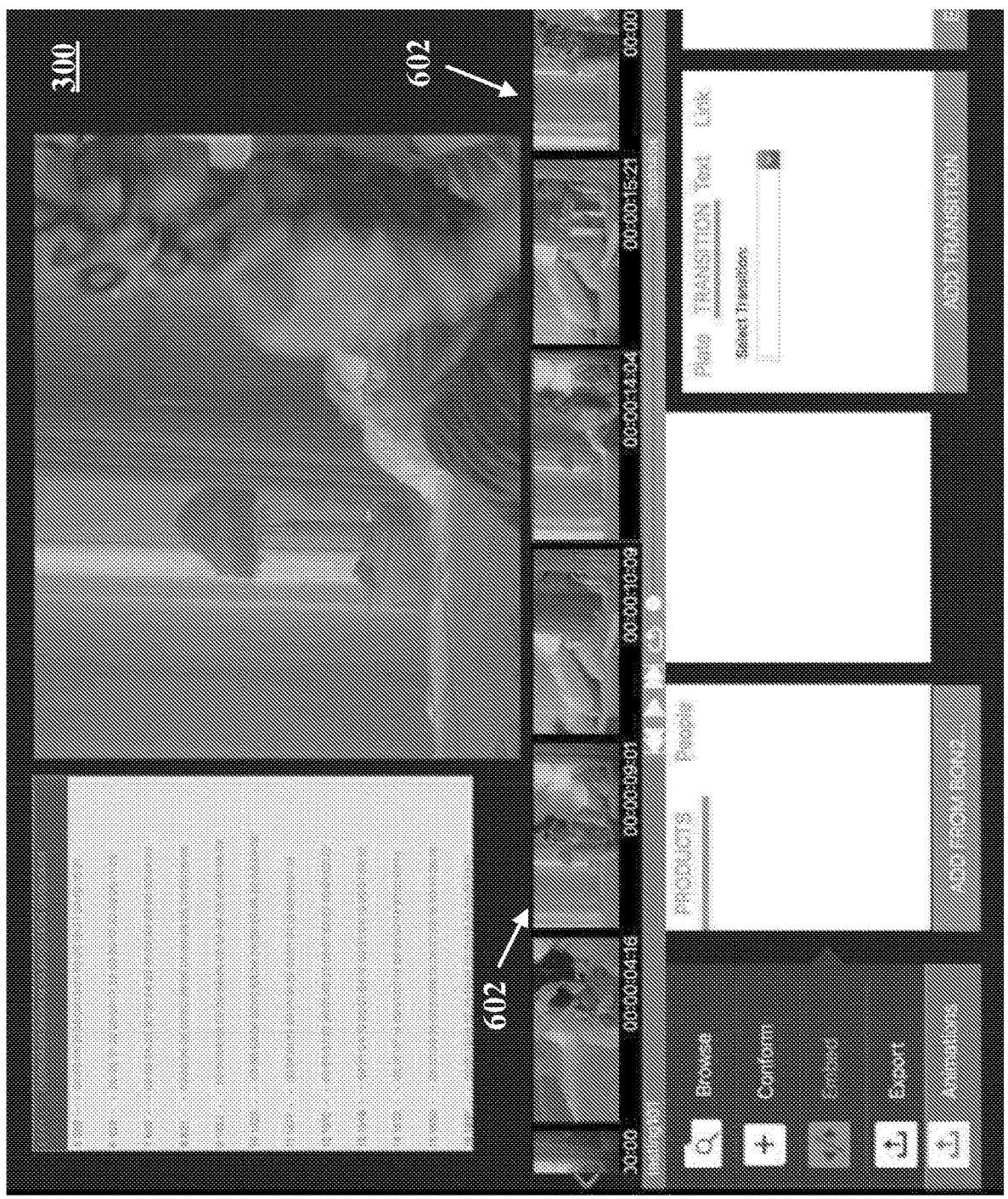

The flowchart of FIG. 5 illustrates processes for receiving a selection for a specific sequence of video frames through the authoring tool. The screenshot of FIG. 6 illustrates a set of specific sequences of video frames 602 in the primary GUI 300 (also referred to herein as a specific set of video sequences). Referring to FIG. 5, a device (such as a PC device or a server) prompts a user to select a specific scene from a plurality of scenes with the device (Step 502). The authoring tool uses the EDL file to return the plurality of scene detected in the original video. Alternately, the authoring tool can use a separate scene detection server in communication with the PC device to generate the plurality of scenes. In yet another embodiment, the user can manually create the plurality of scenes by using shortcut keys. Once created, the plurality of scenes can be displayed as a plurality of thumbnails. A thumbnail can show the starting frame of the specific scene. The user can click on any of the plurality of thumbnails and go directly to the selected specific scene for editing. A selection for a specific scene can be received through a device, such as a PC device or a server (Step 504). The user can loop or play through the specific scene or jump to another scene as selected.

Figure 7:
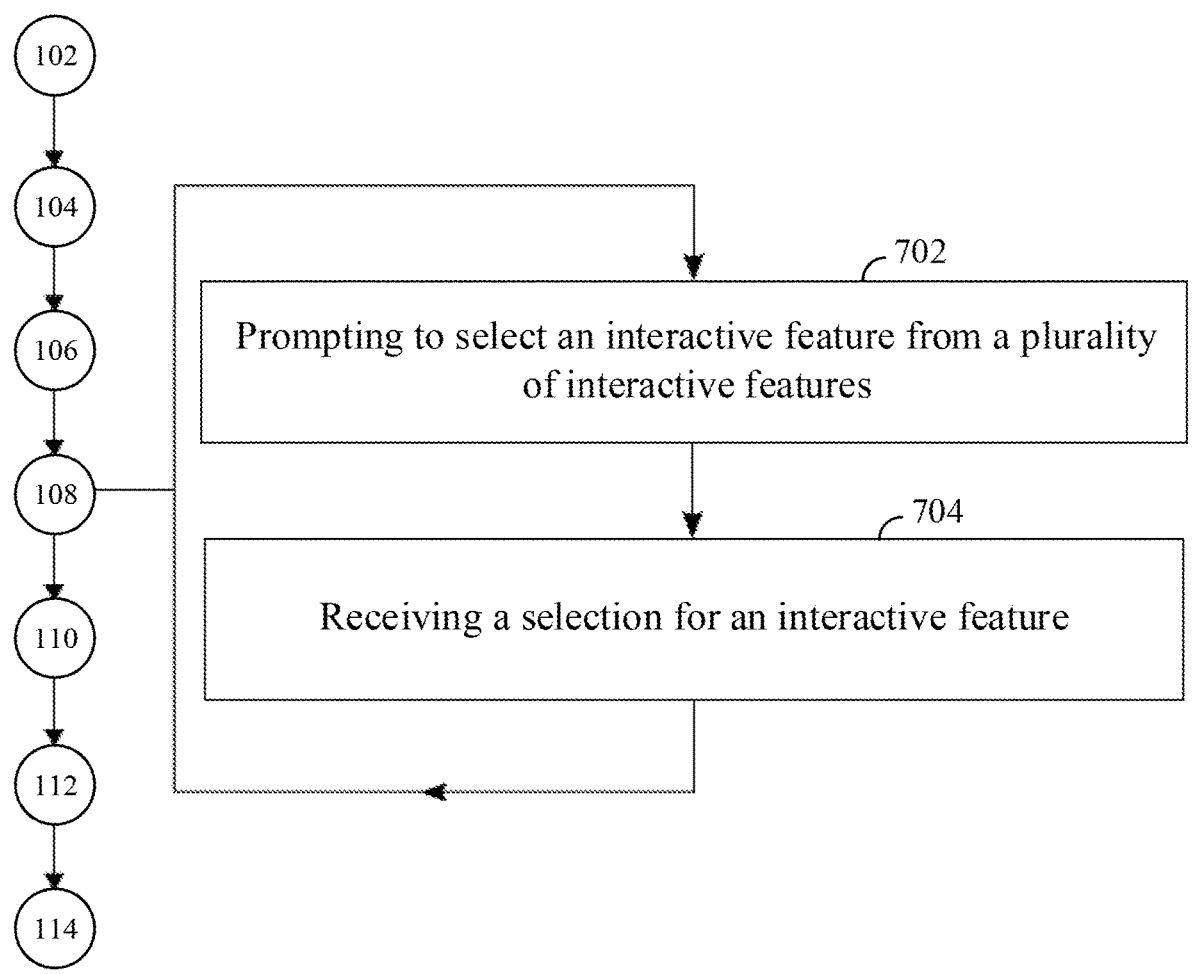

The flowchart of FIG. 7 illustrates processes for receiving a selection of an interactive feature to add to a specific sequence of video frames (also referred to herein as a specific video sequence) or to add to a specific set of video sequences. Once at the specific scene, a device (such as the PC device or the server) prompts to select an interactive feature from a plurality of interactive features (Step 702). In an example implementation, the interactive feature can be pictures, animations, links, and or plate features. In most cases, a device (such as a PC device or a server) receives a selection for an interactive feature (Step 704). The authoring tool allows users to upload the interactive feature from the PC device or access the interactive feature from an online server database in communication with the AV player-editor website. For instance, if manual input is selected, the authoring tool provides a text box for manual entry. Once the interactive feature is selected, authoring tool integrates the interactive feature into the image tile that is displayed in the specific scene.

Figure 8:
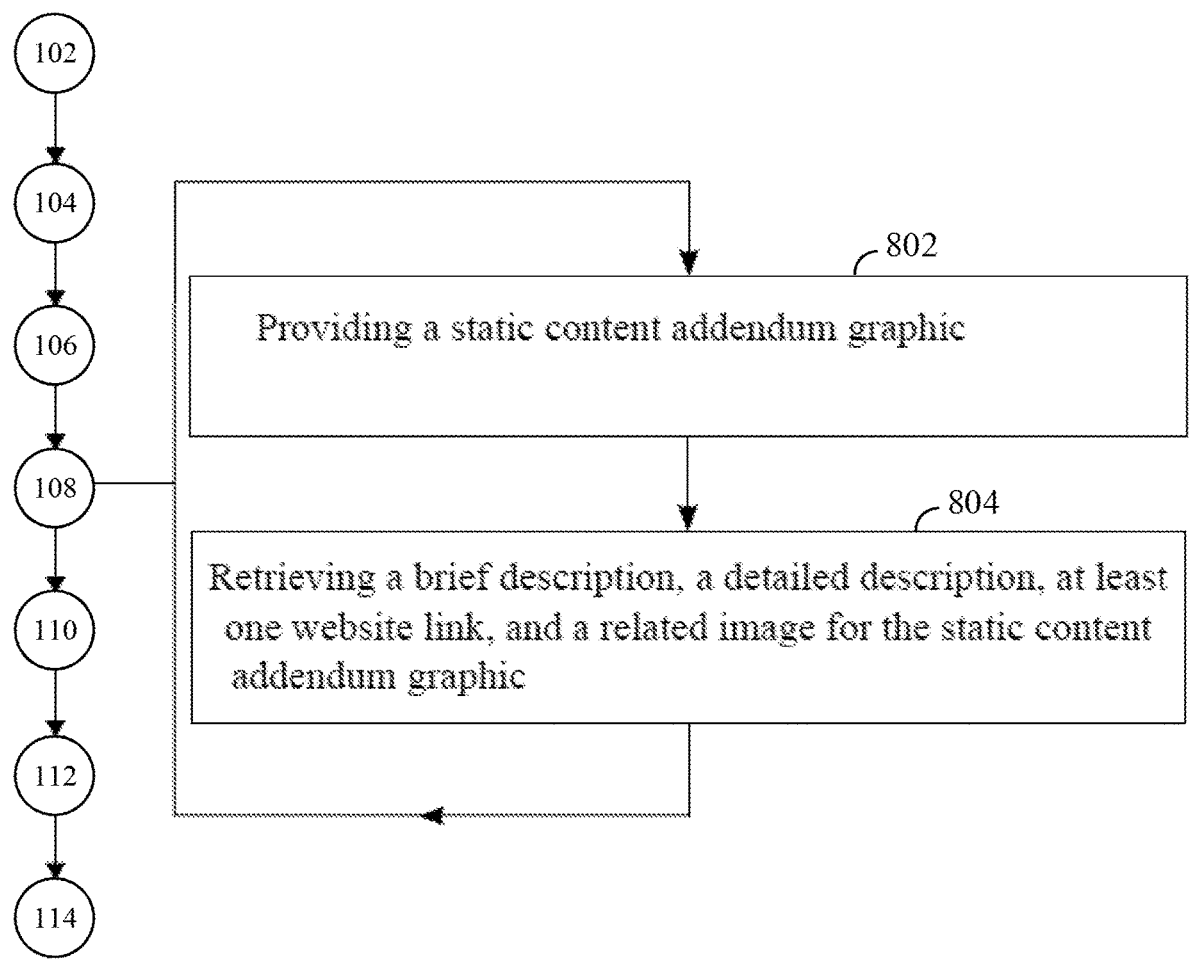
Figure 9:
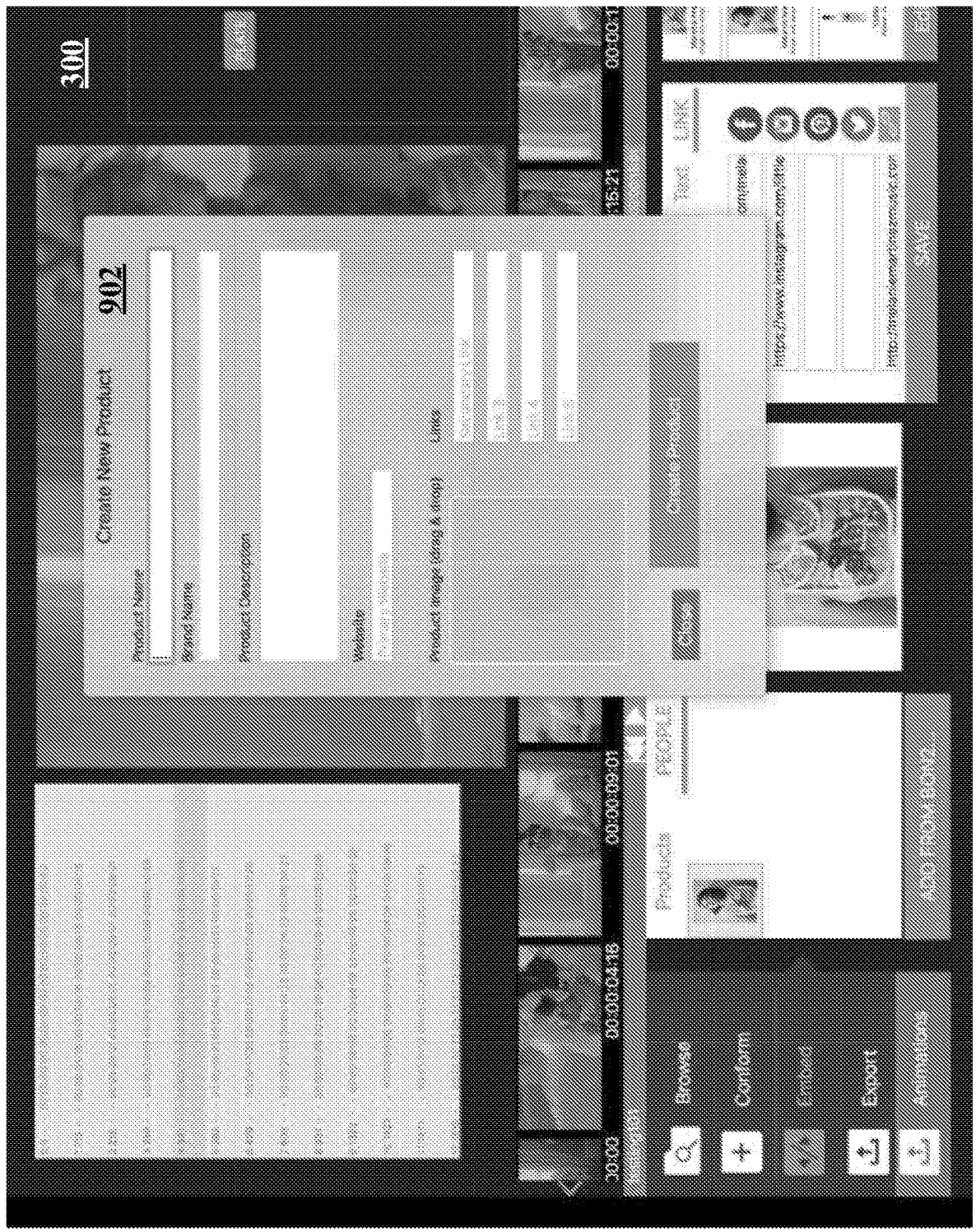
Figure 10:
Figure 11:
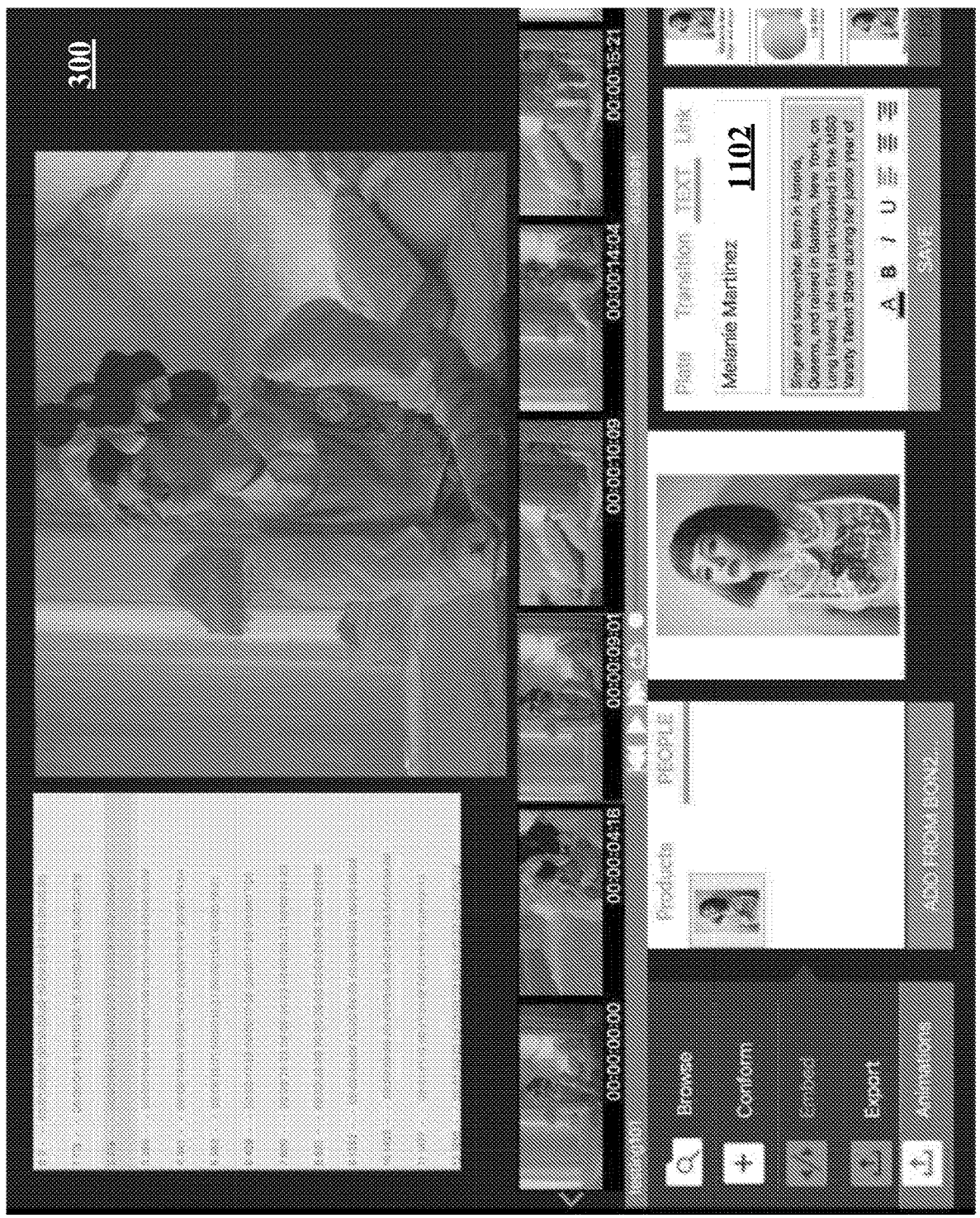

The flowchart of FIG. 8 illustrates processes for generating a static content addendum graphic as an interactive feature to add to a specific video sequence or a specific set of video sequences. The screenshot of FIG. 9 illustrates a sub-GUI 902, in the primary GUI 300, for inputting topical information and links to additional content associated with the static content addendum graphic. The screenshot of FIG. 10 illustrates a sub-GUI 1002, in the primary GUI 300, provided by the authoring tool for inputting topical information and links to additional content associated with the static content addendum graphic and a person displayed in in the original video file. Not shown, a similar graphical user interface can be provided by the authoring tool for inputting topical information and links to additional content associated with the static content addendum graphic and a place or thing displayed in the original video file. The screenshot of FIG. 11 illustrates a sub-GUI 1102, in the primary GUI 300, provided by the authoring tool for inputting a detailed description associated with the static content addendum graphic and the person displayed in the original video file. Not shown, a similar graphical user interface can be provided by the authoring tool for inputting a detailed description associated with the static content addendum graphic and a place or thing displayed in the original video file. The interactive feature can be static pictures, texts, links, plate features animations, or dynamic audio, videos, graphics that can be implemented in the image tile.

In some embodiments, a static content addendum graphic can be provided as one of the at least one interactive feature (Step 802). The static content addendum graphic can include a profile of an artist, a user, another person, a place, or a thing. The profile is meant to briefly introduce the artist, user, other person, place, or thing. The PC device can retrieve a brief description, a detailed description, at least one website link, and a related image for the static content addendum graphic during Step 108 (Step 804). The related image can be a locally stored on the PC device. Similarly, the user can manually insert the brief description, the detailed description, and the at least one website link manually through a text box.

Figure 12:
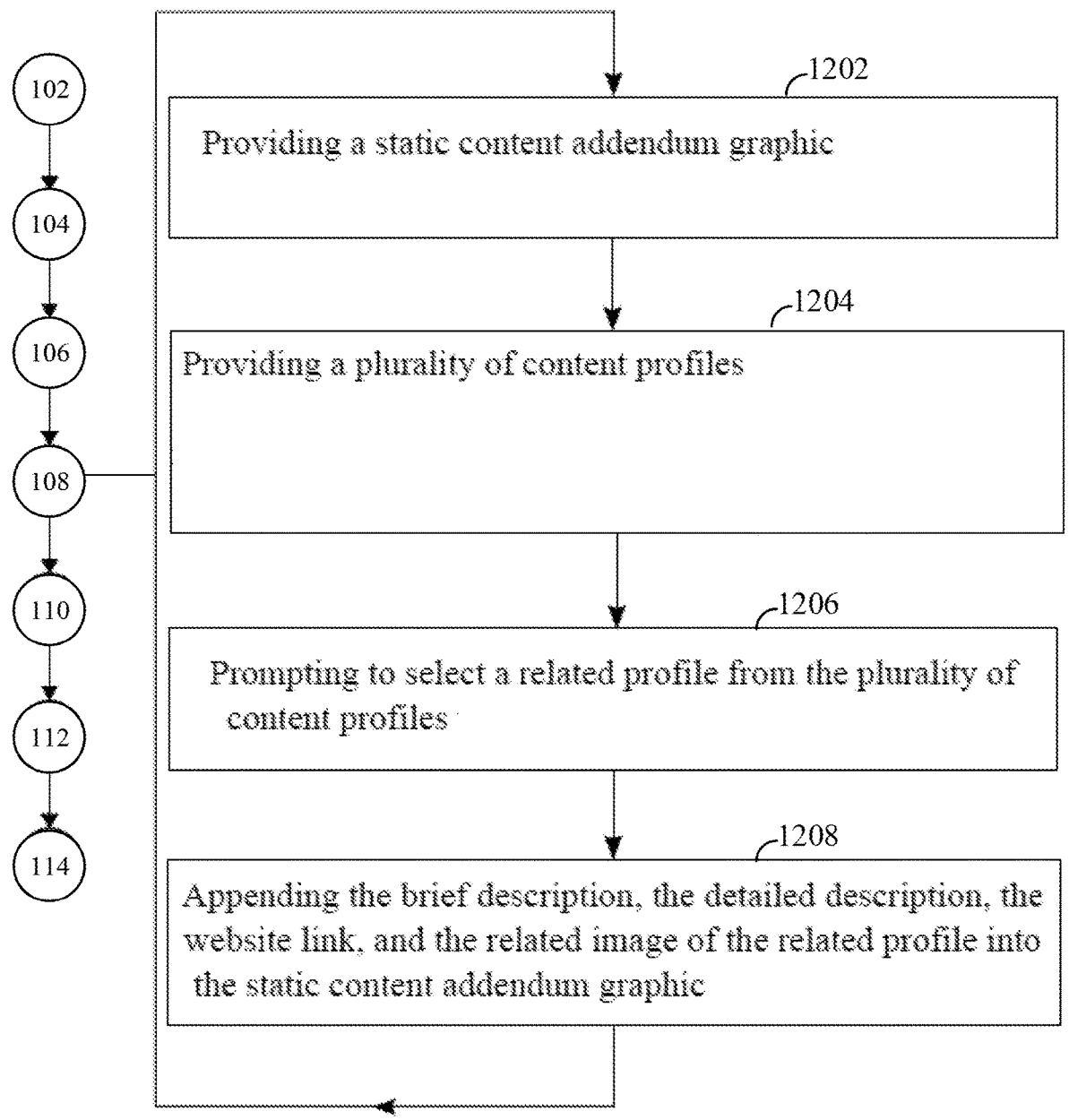
Figure 13:
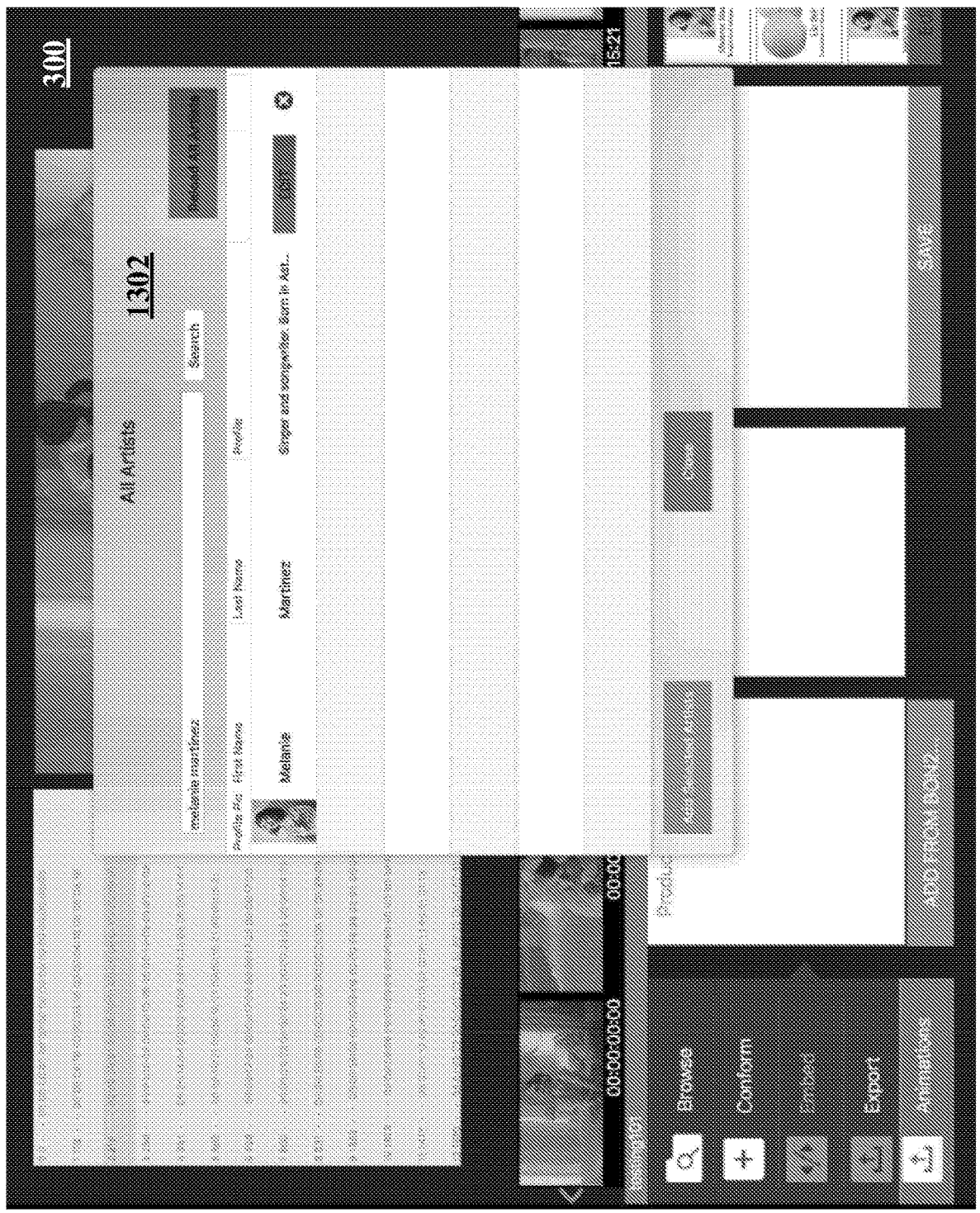
Figure 14:
Figure 15:
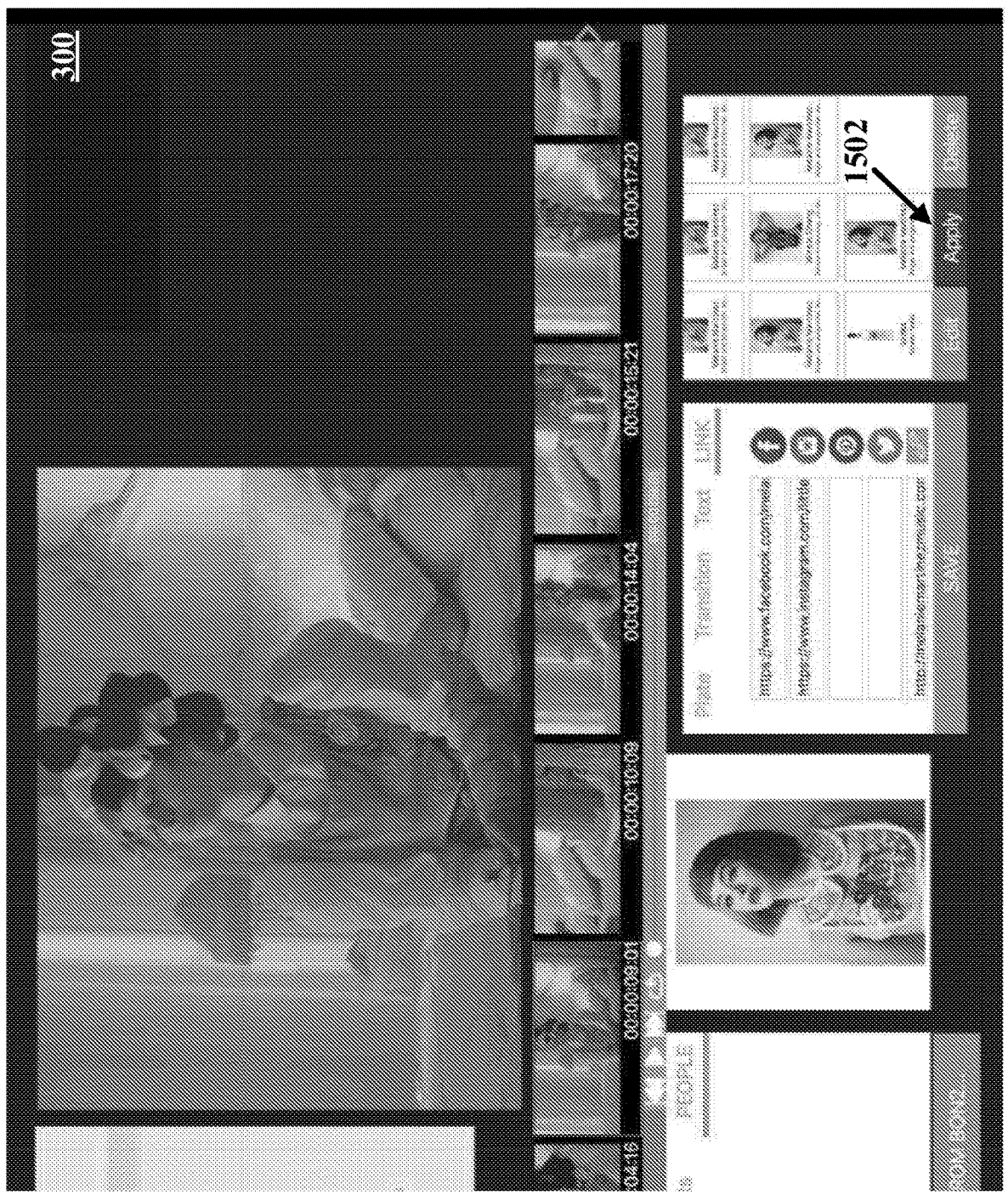

Referring to FIGS. 12-15, in some embodiments, a profile can be automatically generated with information from the online server database. The flowchart of FIG. 12 illustrates processes for retrieving a profile of a person, place, or thing and appending the profile to the static content addendum graphic. The screenshot of FIG. 13 illustrates a sub-GUI 1302, in the primary GUI 300, provided by the authoring tool for searching for and inputting a profile (such as a profile implemented by a profile file) associated with the static content addendum graphic and the person displayed in the original video file. Not shown, a similar graphical user interface can be provided by the authoring tool for searching for and inputting a profile associated with the static content addendum graphic and a place or thing displayed in the original video file. The searching can be performed by a search engine through an online database. The screenshot of FIG. 14 illustrates a sub-GUI 1402, in the primary GUI 300, provided by the authoring tool for populating a bin of profiles associated with the static content addendum graphic and/or the person, place or thing associate with the static content addendum graphic. Also, shown is a sub-GUI 1404 for populating a bin of links to web sites associated with the static content addendum graphic and/or the person, place or thing associate with the static content addendum graphic. The screenshot of FIG. 15 illustrates the graphical user interface element 1502 provided by the authoring tool for selecting a profile from the bin of profiles displayed in FIG. 14.

A static content addendum can be provided (Step 1202) and a plurality of content profiles can be provided (Step 1204). In some embodiments, the profiles can be stored on the remote server. Each of the plurality of content profiles can include a brief description, a detailed description, at least on website link, and a related image. In this embodiment, the plurality of content profiles can be generated from the information stored in the online server database. The user can search through an online server database for content profiles related to the artist, user, other person, place, or thing being featured in the specific scene. A device (such as the PC device or the server) then prompts to select a related profile from the plurality of content profiles during Step 108 (Step 1206). In some embodiments, a search engine allows users to search for specific people, places, or things featured in the specific scene. For example, the user can enter a name of a person, place, or thing into the search engine and search through the online server database. The search engine returns exact matches to the search query. For example, if the search query is the name of an artist, the related profile with artist name is returned. The user can use the related profile to automatically obtain the relevant information about the artist. Then, a device (such as the remote server) appends the brief description, the detailed description, the website link, and the related image of the related profile into the static content addendum graphic (Step 1208). Also, the user can click on the related profile to fill the static content addendum graphic. The website links can include links to the social media profiles such as Facebook, Twitter, or Instagram. Further, the static content addendum graphic can also include a direct link to the user account in the AV player-editor website associated with the person, place, or thing. The direct link can be embedded into the related image.

Figure 16:
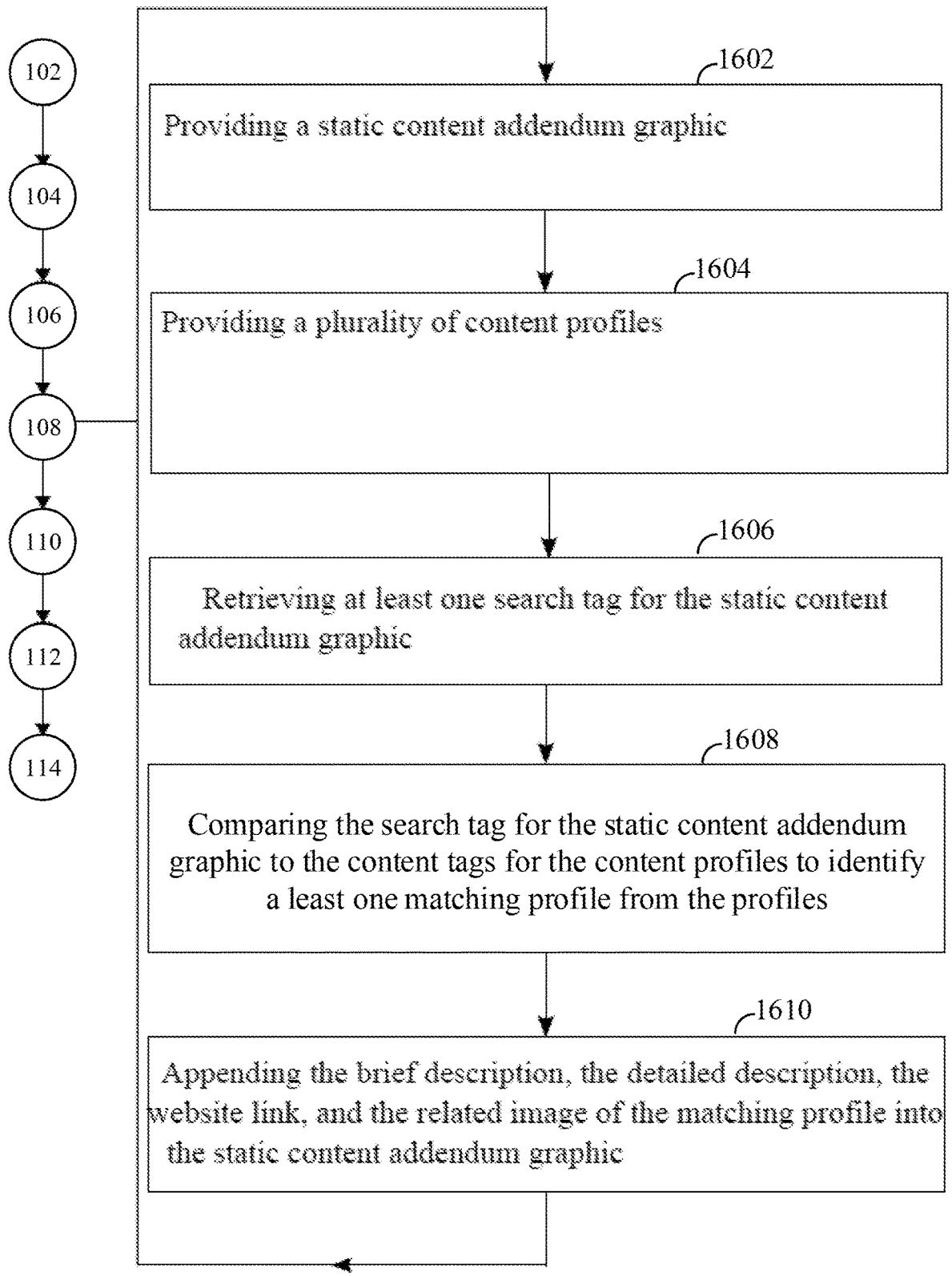

The flowchart of FIG. 16 illustrates processes for retrieving a matching profile from a search tag for the static content addendum graphic. The user can input a generic tag into the specific scene. A plurality of content profiles stored on a device (such as the remote server) can be provided (Step 1604). Also, a static content addendum graphic can be provided (Step 1602). Each of the plurality of content profiles can include at least one content tag, a brief description, a detailed description, at least one website link, and a related image. The at least one content tag can be used to generate at least one matching content profile. In some examples, the user uses the authoring tool to input the generic tag. Also, a device (such as a PC device or a server) can retrieve at least one search tag for the static content addendum graphic during Step 108 (Step 1606). The at least one search tag can include the name of the person, place, or thing, but can also include broad categories. The search tag allows the remote server to customize the static content addendum graphic for a user account. When a user views the edited video, the remote server automatically embeds a customized image tile showing the person, place, or thing most relevant to the user. A device (such as a PC device or a server, e.g., remote server) can compare the search tag for the static content addendum graphic to the content tag for each of the plurality of content profiles to identify at least one matching profile from the plurality of content profiles (Step 1608). To customize the search results, the specific preferences of a user account, such as watch history, like history, pages followed, and the like, can also be used to identify at least one matching profile. For example, if the viewer that owns the user account has been searching for specific types of shoes, the remote server uses the search history of the user account, the search tag, and the content tag to find the matching profile. Then, a device (such as the remote server) appends the brief description, the detailed description, the website link, and the related image of the related profile into the static content addendum graphic (Step 1610)

Figure 17:
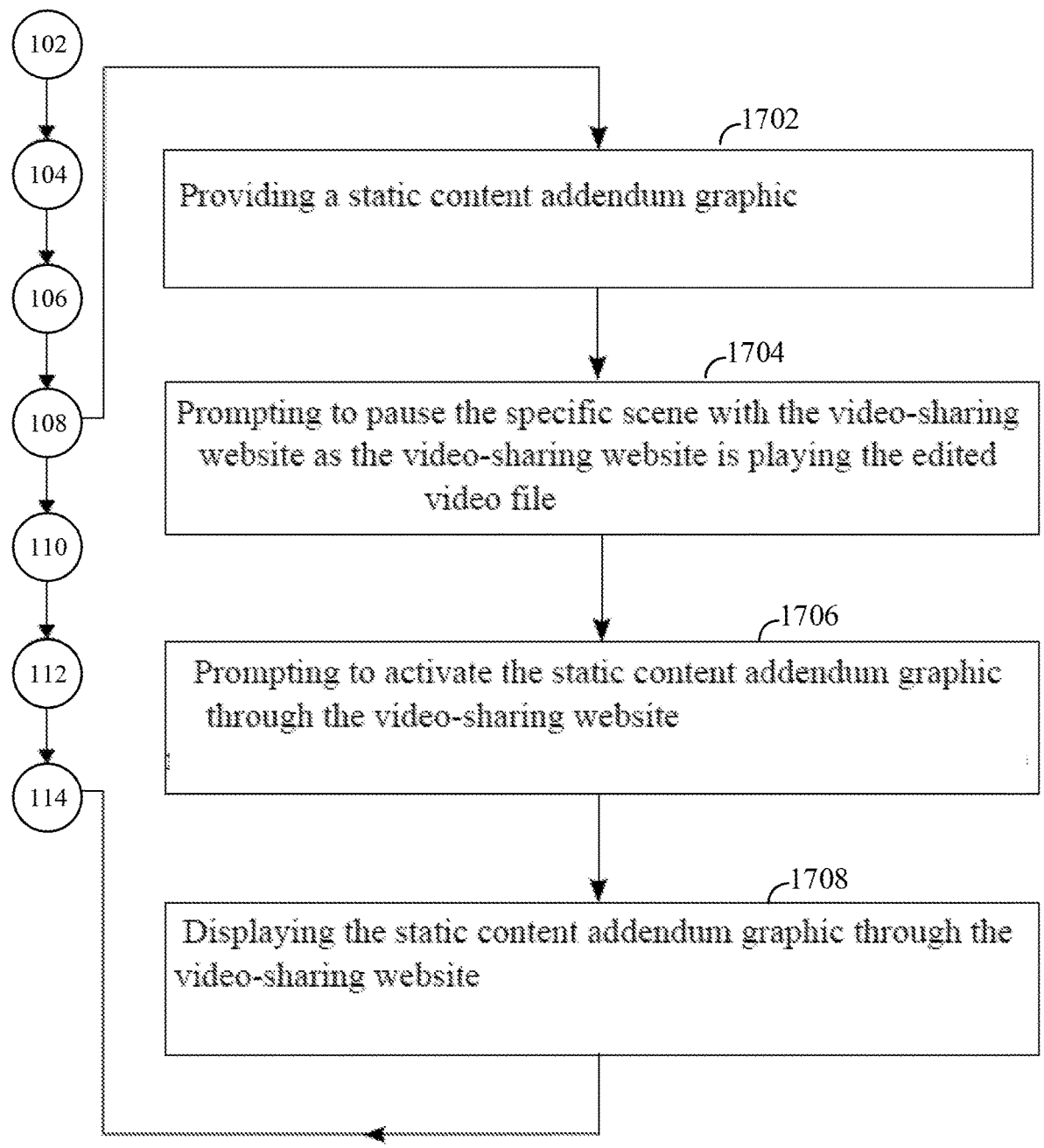

The flowchart of FIG. 17 illustrates processes for displaying the static content addendum graphic through a video-sharing website. In an example implementation, a video-sharing website prompts a user to pause a specific scene as the video-sharing website is playing an original or an edited video file during Step 112 (Step 1704). Also, a static content addendum graphic can be provided (Step 1702). For instance, the AV player-editor website displays the static content addendum graphic as an image tile on the edited video. For example, if a device (such as the remote server) pauses the edited video file at the specific scene, the video-sharing website prompts to activate the static content addendum graphic during Step 114 (Step 1706). For instance, if the user pauses the edited video on the specific scene, the user is once again prompted to activate the image tile. Then, for example, if a device (such as the remote server) is triggered to activate the static content addendum graphic, the video-sharing website displays the static content addendum graphic during Step 114 (Step 1708). For example, if the user decides to activate the image tile, the image tile can be overlaid on the edited video. The user can resume the edited video by clicking outside of the image tile. However, the user is prompted to activate the image tile every time the edited video is paused. As the edited video plays through the plurality of scenes, the corresponding the specific scene and the image tile also changes.

Figure 18:
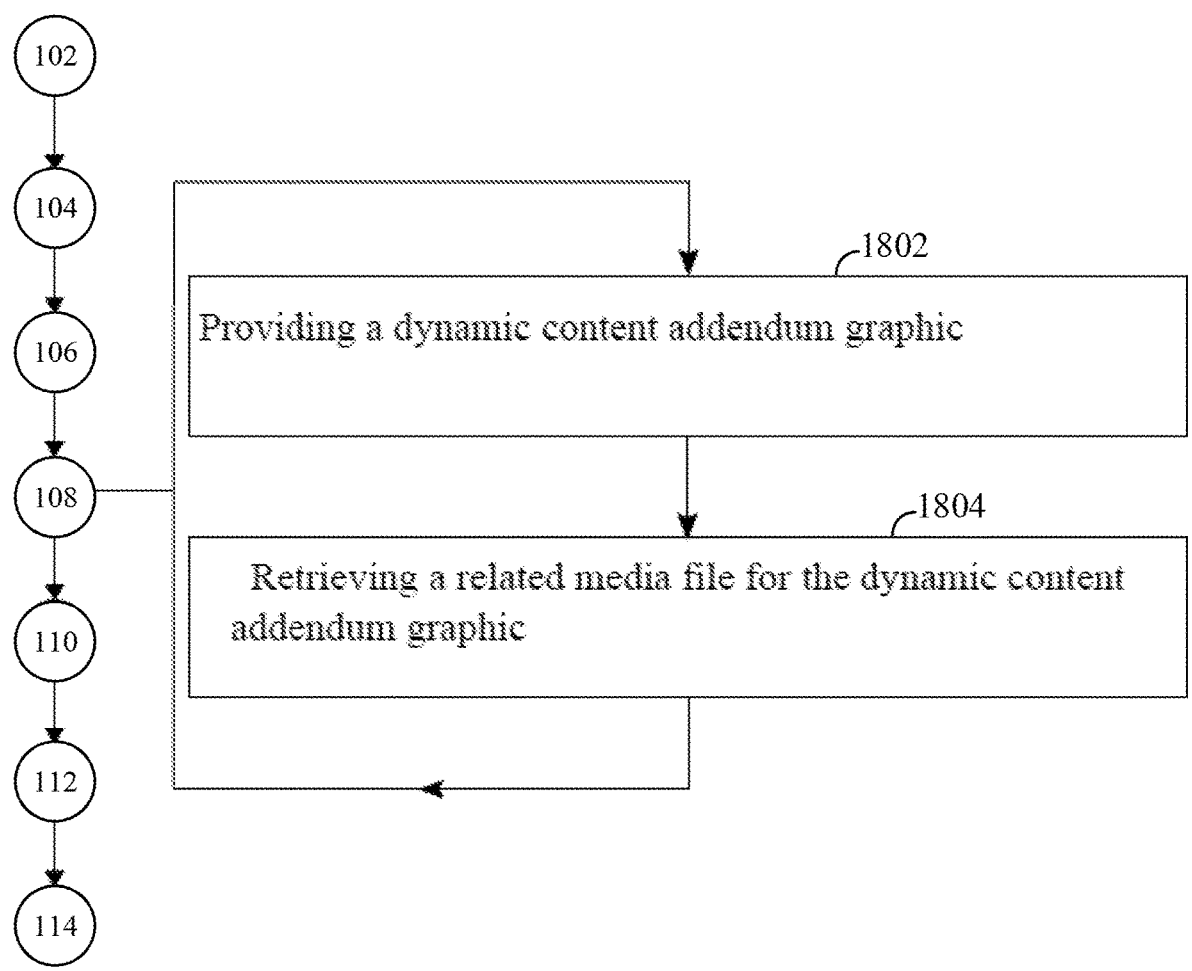
Figure 19:
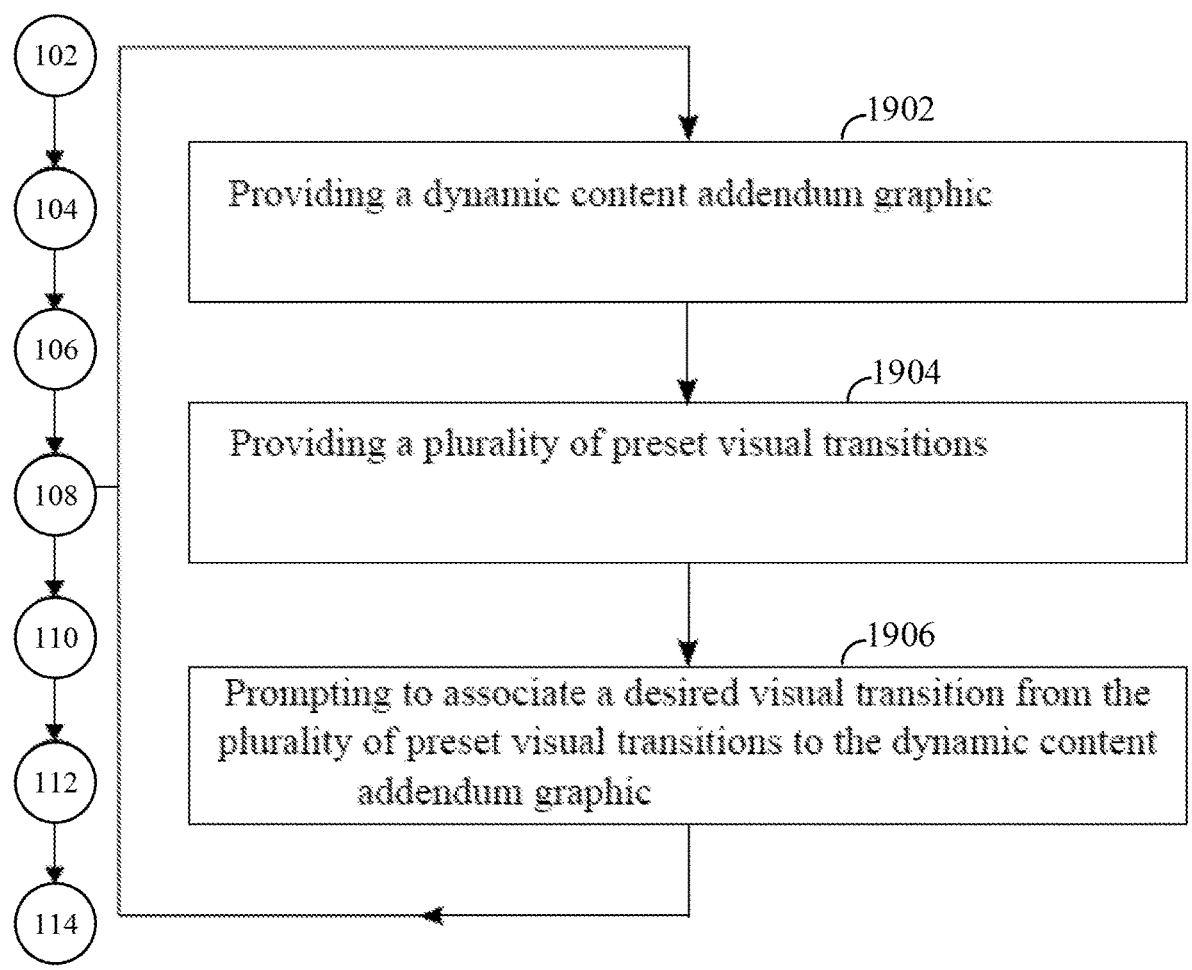

The flowchart of FIG. 18 illustrates processes for generating a dynamic content addendum graphic as an interactive feature to add to a specific video sequence or a specific set of video sequences. The flowchart of FIG. 19 illustrates processes for associating a visual transition from a set of preset visual transitions with the dynamic content addendum graphic. In some embodiments, a dynamic content addendum graphic is provided as one of the at least one interactive feature (Step 1802). As the name implies, the dynamic content addendum graphic contains dynamic media such as videos, animations, or audio files. In such an implementation, the dynamic content addendum graphic can be locally stored on the user's computer. A device (such as the PC device) retrieves a related media file for dynamic content addendum graphic during Step 108 (at Step 1804). The media file can be a video file, an audio file, or any file format that results in dynamic media being played on the content addendum graphic.

Also, a dynamic content addendum graphic can be provided (Step 1902) as well as a plurality of preset visual transitions stored on a device (such as a PC device or a server) can be provided (Step 1904). The plurality of preset visual transitions can be used to transition between the edited video and the dynamic content addendum graphic of the image tile. The visual transition can be a fade, dissolve, swipe, shape transition, and the like. In some examples, the plurality of preset visual transition can be stored locally on the PC device. A device (such as a PC device) can provide prompt for associating a selected visual transition from the plurality of visual transitions to the dynamic content addendum graphic (Step 1906). In an example embodiment, the user can select a custom transition PNG sequence from a drop-down list of the plurality of preset visual transitions.

Figure 20:
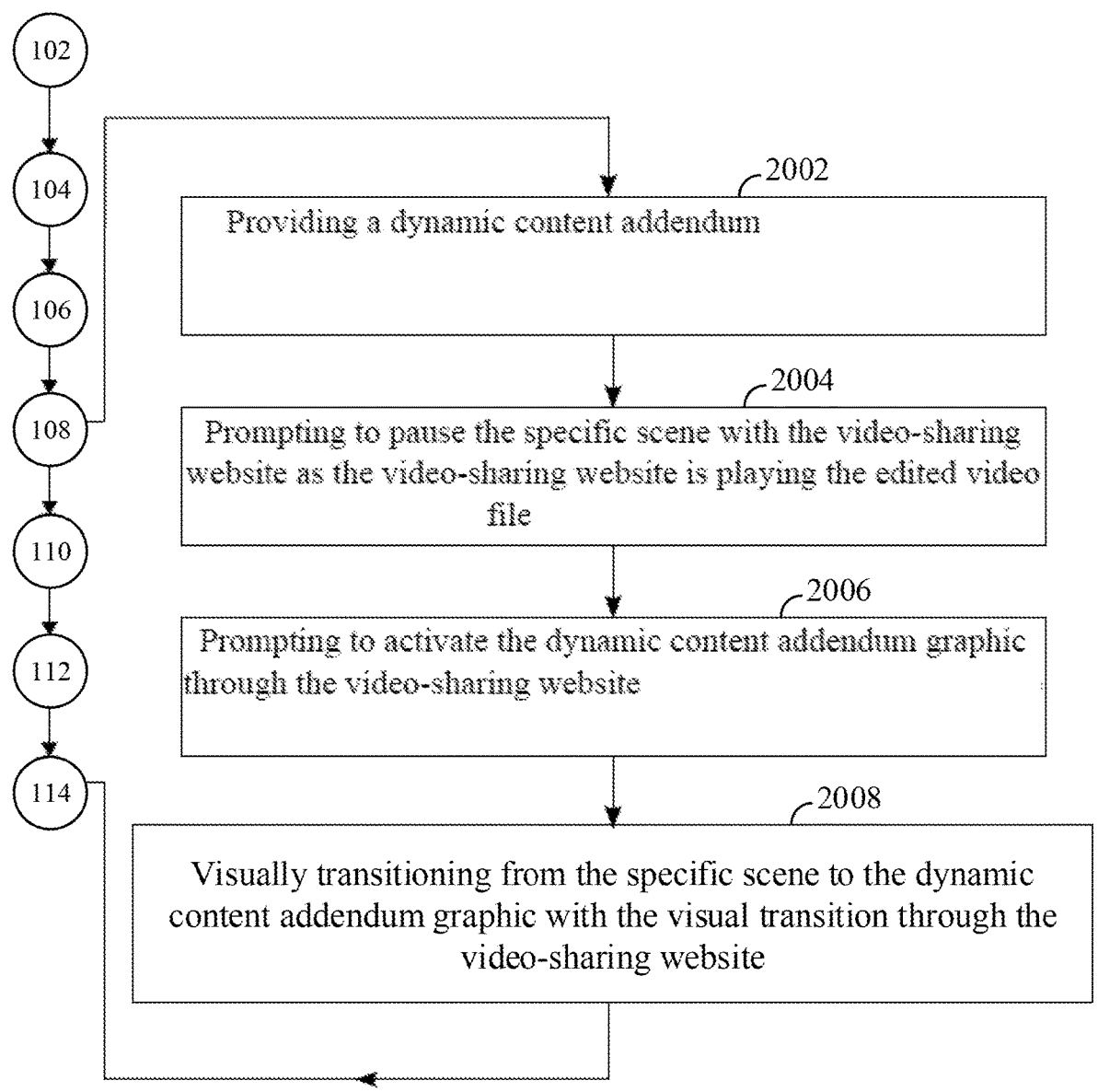
Figure 21:
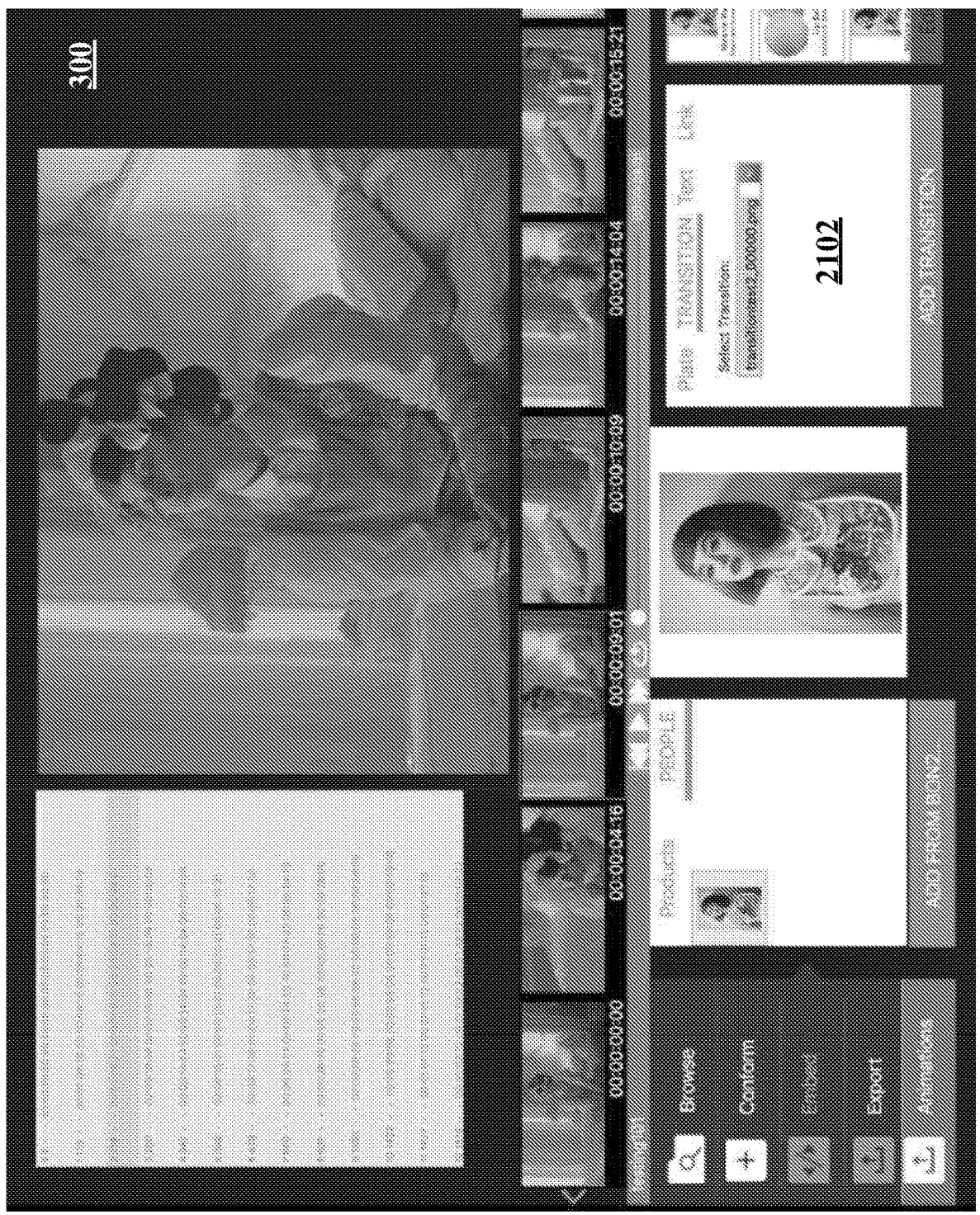

The flowchart of FIG. 20 illustrates processes for visually transitioning from a specific video sequence or a specific set of video sequences to the dynamic content addendum graphic with the selected visual transition. The screenshot of FIG. 21 illustrates a sub-GUI 2102, in the primary GUI 300, provided by the authoring tool for uploading a visual transition. Along with the static content addendum graphic in the form of texts, links, and images, the image tile can also feature dynamic content addendum graphic in the form of preset transitions. Then, the dynamic content addendum graphic can be provided as the at least one interactive feature (Step 2002). The dynamic content addendum graphic can be associated to a selected visual transition. Further, the video-sharing website prompts to pause the specific scene as the video-sharing website is playing the edited video file during Step 112 (Step 2004). This is because the edited video plays on the native video player of the AV player-editor website which only receives basic commands from the PC device. Also, the video-sharing website can prompt to activate the dynamic content addendum graphic through during Step 114 (Step 2006), such as if the remote server pauses the edited video file at the specific scene. In an example, the remote server can be responsible for both prompting and activating the dynamic content addendum graphic in the AV player-editor website. In such an example, if the remote server is triggered to activate the dynamic content addendum graphic during Step 114, the specific scene visually transitions to the dynamic content addendum graphic with the selected visual transition through the video-sharing website (Step 2008). Step 2008 can also occur when another device is triggered to activate the dynamic content addendum graphic during Step 114. In some embodiments, the visual transition only applies to the dynamic content addendum graphic and the static content addendum graphic remains unaffected. For example, if an image tile features a video and a text description, the visual transition applies only to the part of the image tile that features the video.

Figure 22:
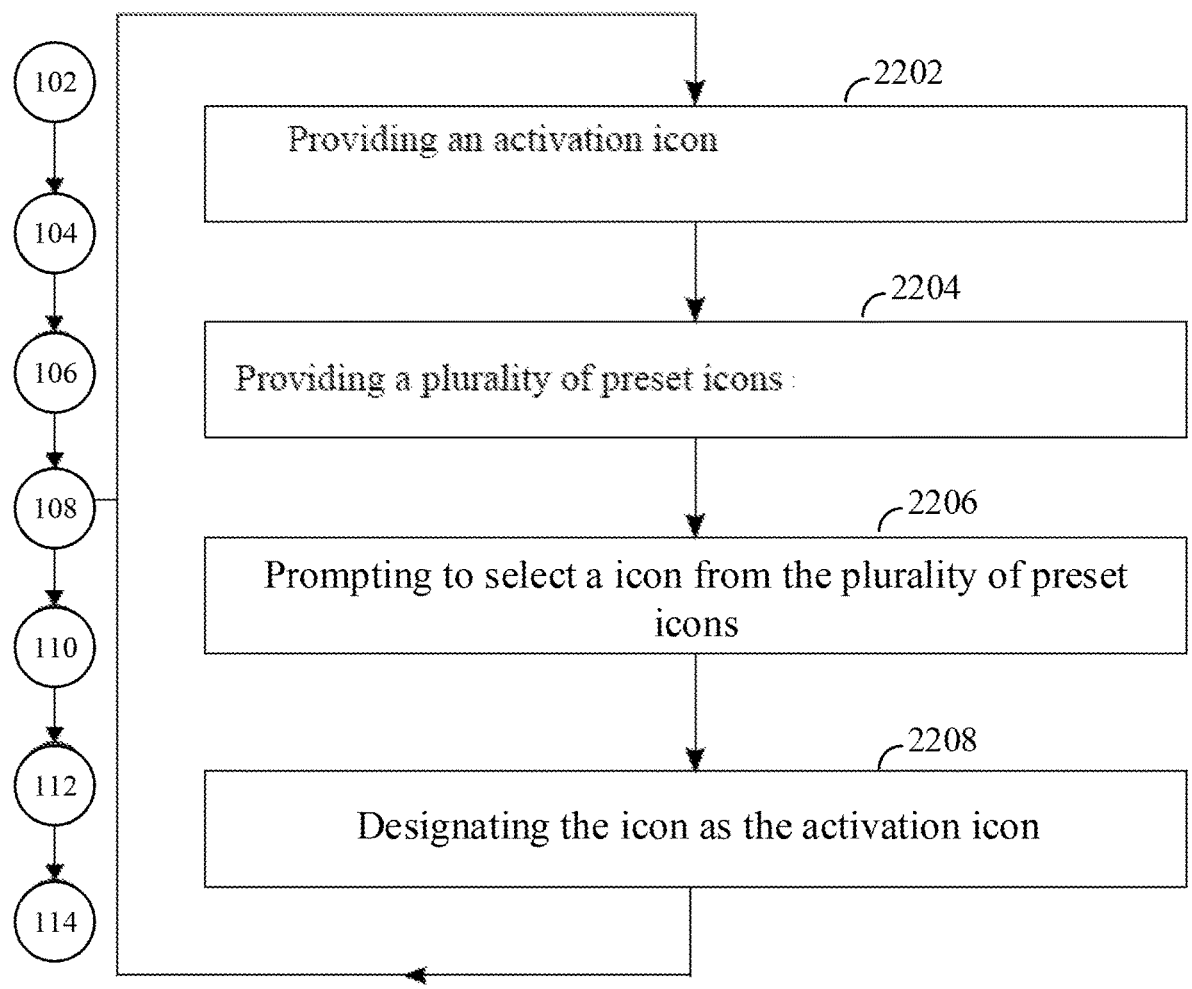
Figure 23:
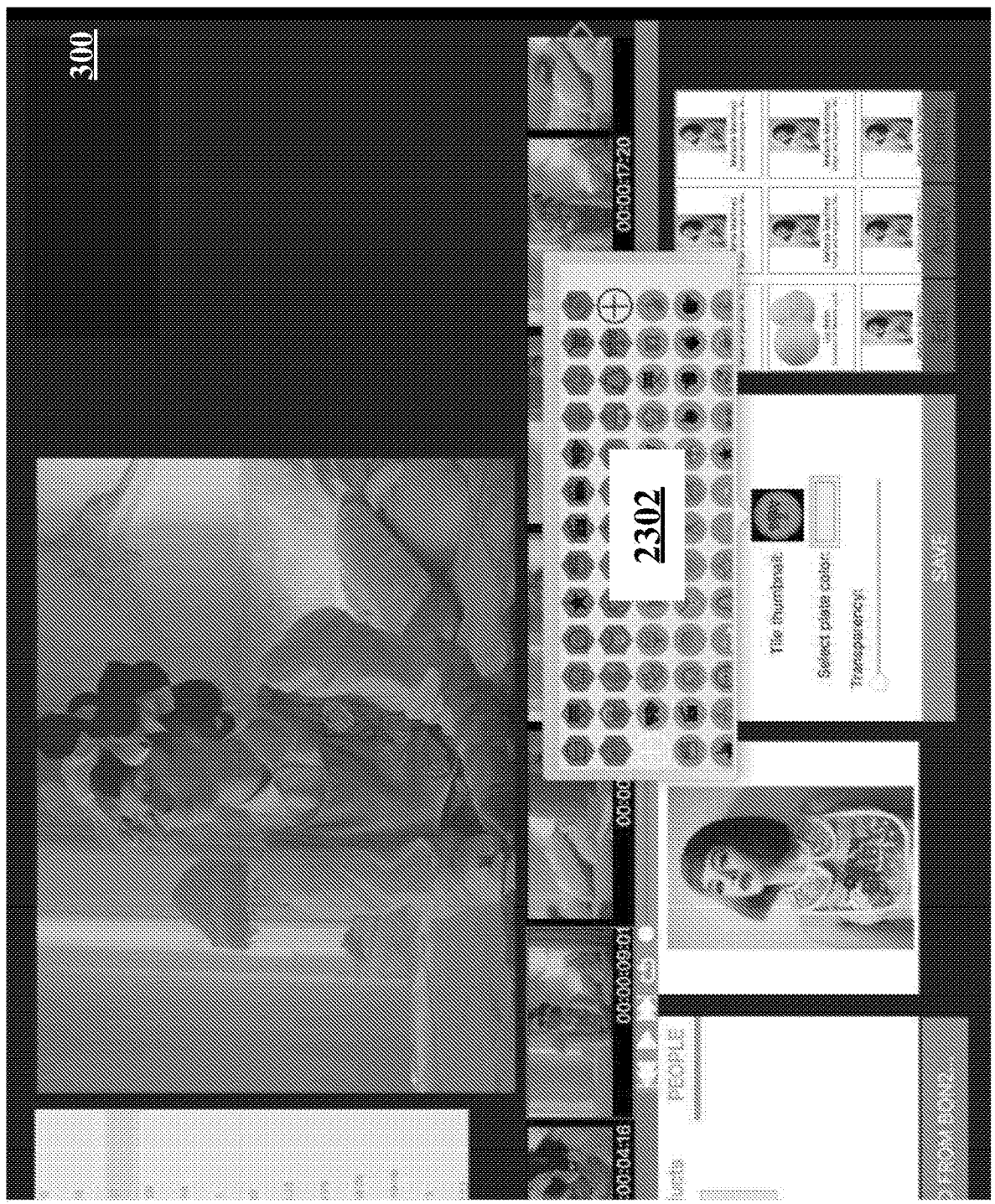
Figure 24:
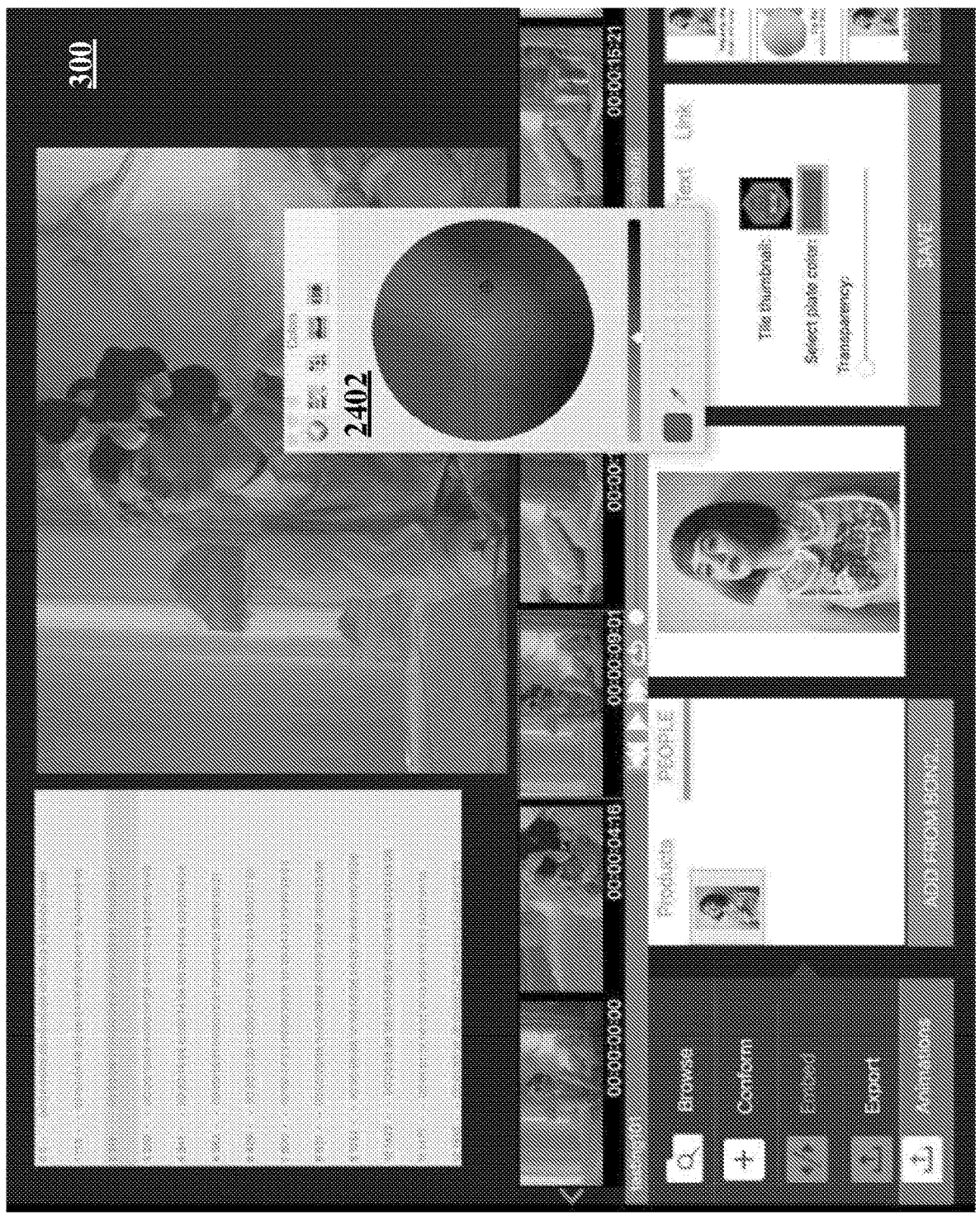
Figure 25:
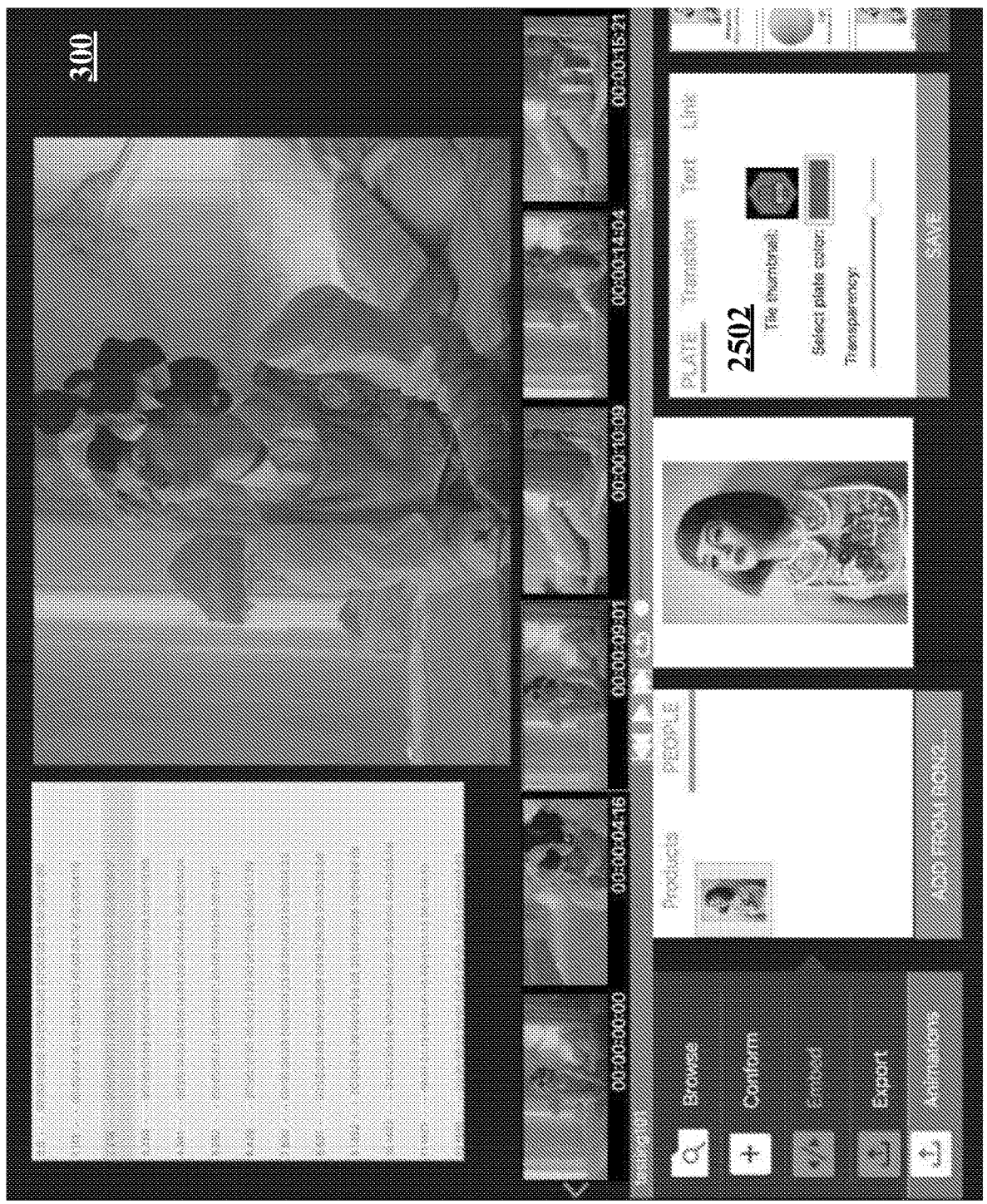

The flowchart of FIG. 22 illustrates processes for providing an activation icon and designating an icon as the activation icon. The activation icon can initiate the interactivity of a static or a dynamic content addendum graphic. The screenshot of FIG. 23 illustrates a sub-GUI 2302, in the primary GUI 300, provided by the authoring tool for choosing an activation icon. The screenshot of FIG. 24 illustrates a sub-GUI 2402, in the primary GUI 300, provided by the authoring tool for user editing a color of a selected icon. The screenshot of FIG. 25 illustrates a sub-GUI 2502, in the primary GUI 300, provided by the authoring tool for user editing a transparency level of a selected icon. In an example embodiment, the user is prompted to activate the image tile with an activation icon. The activation icon can be provided as one of the at least one interactive feature (Step 2202). In some embodiments, the authoring tool can be used to embed the activation icon into the specific device. In an embodiment, a plurality of preset icons stored on a device (such as the PC device) can be provided (Step 2204). A preset icon can represent a specific person, place, or thing displayed on the edited video. Using the plurality of preset icons, the user can identify a plurality of people, places, or things found in the specific scene. In an example embodiment, a device (such as the PC device) prompts to select an icon from the plurality of preset icons (Step 2206). The authoring tool can be pre-loaded with the plurality of preset icons. The plurality of preset icons can be designed to be easily distinguishable from each other. The plurality of preset icons can also be made in an external program and imported into the authoring tool. The selected icon can then be designated the activation icon by a device, such as by a remote server (Step 2208).

Figure 26:
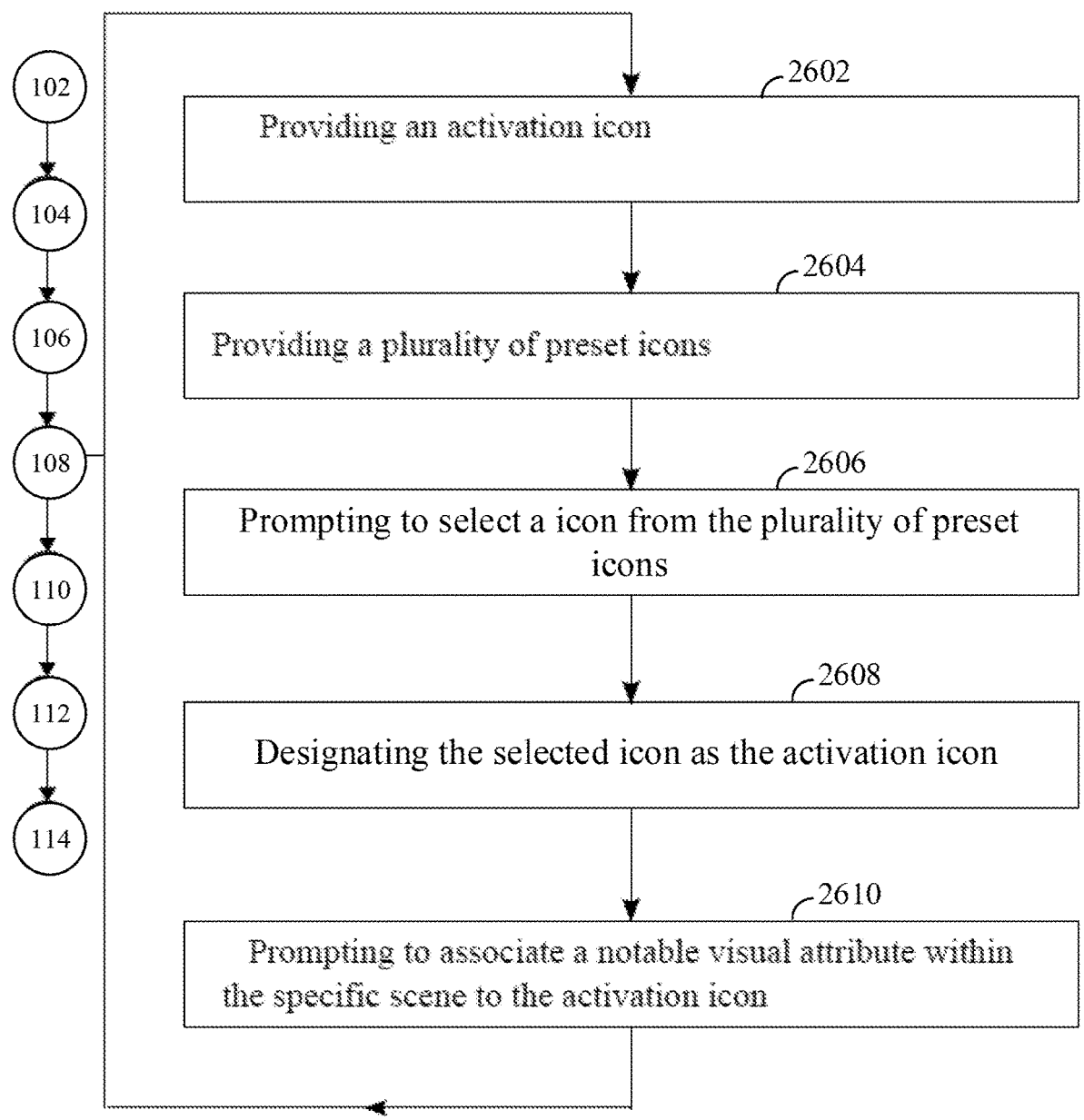
Figure 27:
Figure 28:
Figure 29:

The flowchart of FIG. 26 illustrates processes for prompting to associate, to a selected activation icon, a notable visual attribute within a specific video sequence or a specific set of video sequences. The screenshot of FIG. 27 illustrates GUI element 2702, in the primary GUI 300, provided by the authoring tool for user positioning a selected activation icon 2704 on or near a notable visual attribute 2706 in a specific video sequence or a specific set of video sequences. The screenshot of FIG. 28 illustrates the graphical user interface elements 2802 and 2804, in the primary GUI 300, provided by the authoring tool that allows for a preview of an image tile. An image tile provides an image representative of a person, place, or thing and accompanying text positioned proximate to the representative image. The screenshot of FIG. 29 illustrates the GUI element 2702 provided by the authoring tool that shows the selected activation icon 2704 following the notable visual attribute 2706. A device (such as the PC device) prompts to associate a notable visual attribute within the specific scene to the activation icon (Step 2610). Before the prompt at Step 2610, an activation icon can be provided as one of the at least one interactive feature (Step 2602). Also, a plurality of preset icons stored on a device (such as the PC device) can be provided (Step 2604). And, a device (such as the PC device) prompts to select an icon from the plurality of preset icons (Step 2606). The selected icon can then be designated the activation icon by a device, such as by a remote server (Step 2608). Then, the device can prompt to associate a notable visual attribute within the specific scene to the activation icon at Step 2610. The notable visual attribute can be a distinguishing feature of the person, place, or thing being displayed on the specific scene. This is necessary because the specific scene can feature people, places, or things that can have respective associated image tiles. To help users associate image tiles with the person, place, or thing, an activation icon can be associated with a unique notable visual attribute.

Figure 30:
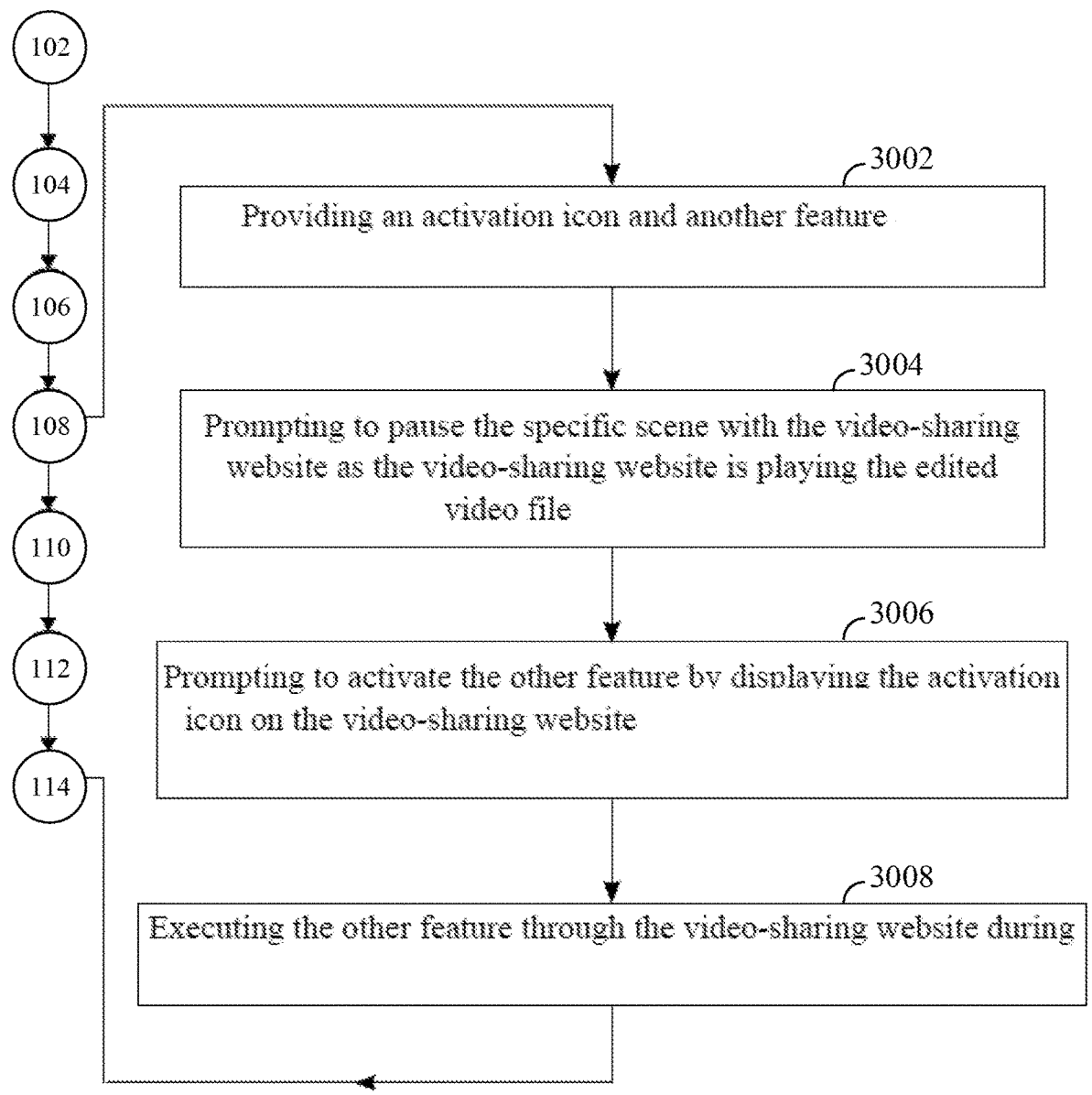
Figure 31:
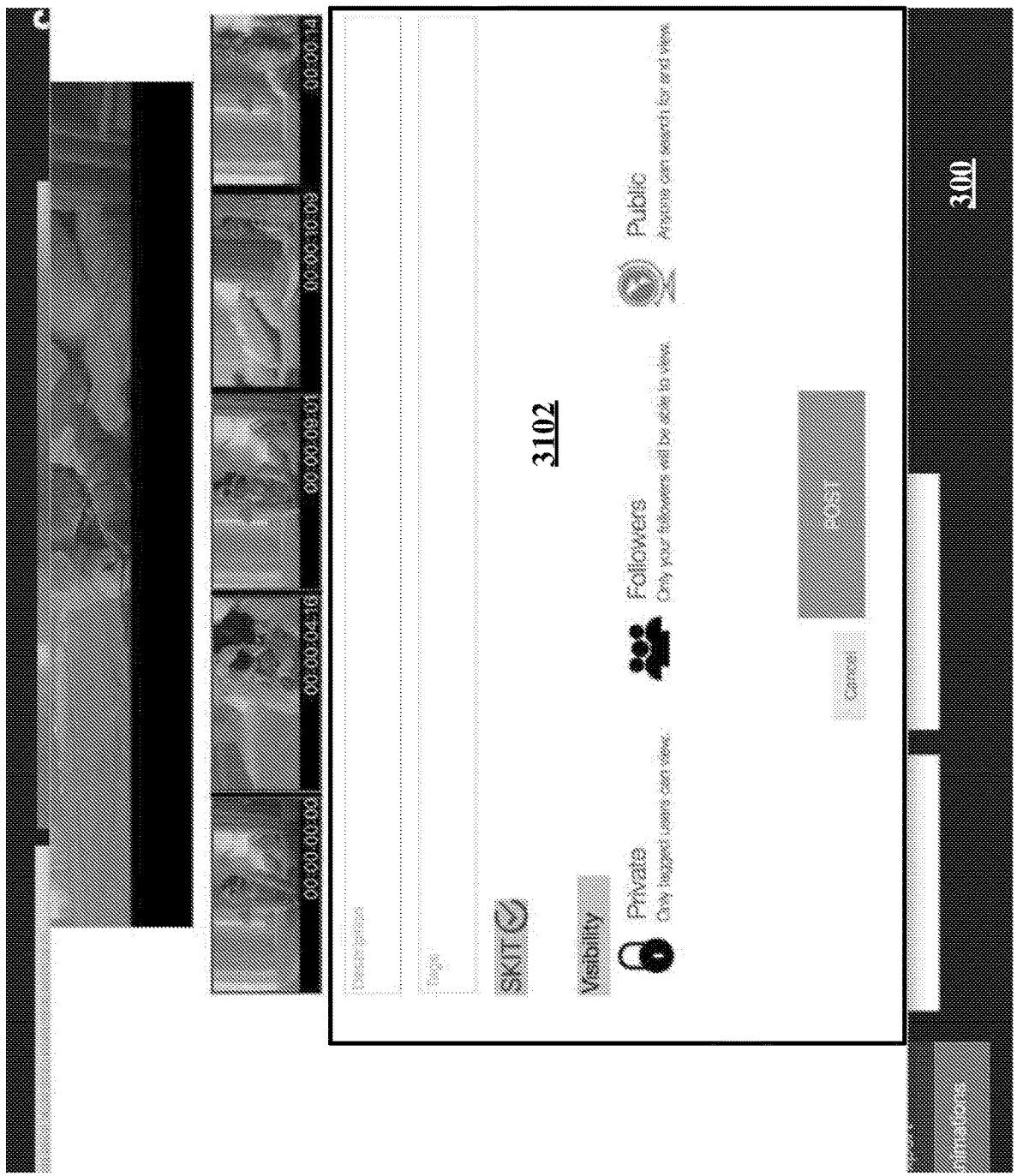

The flowchart of FIG. 30 illustrates processes for executing at least one interactive feature when an activation icon is selected and triggered. The screenshot of FIG. 31 illustrates a sub-GUI 3102, in the primary GUI 300, provided by the authoring tool for editing information about a video being uploaded to a remote server connected to the authoring tool. In an example embodiment, a specific protocol can be utilized by a server or PC device to activate an image tile. For instance, an activation icon and another feature can be provided as two of the at least one interactive feature (Step 3002). Another feature as herein referred to can be a static content addendum graphic or a dynamic content addendum graphic or a combination of the two used in the image tile. The video-sharing website prompts to pause the specific scene as the video-sharing website is playing the edited video file during Step 112 (Step 3004). The AV player-editor website features a proprietary video player that pauses the edited video when the user touches/clicks the screen. There is also a pause button provided on the bottom of the screen. The pause command can be sent from the user's PC device and executed by the remote server. For example, if the remote server pauses the edited video file at the specific scene, the video-sharing website can prompt to activate the other feature by displaying the activation icon (Step 3006). In some embodiments, the activation icon can be positioned close to the person, place, or thing presented by the image tile. For example, if the activation icon is triggered to activate the other feature, the video-sharing website can execute the other feature during Step 114 (Step 3008). In this case, the other feature can be the image tile containing the static content addendum graphic, the dynamic content addendum graphic, or both.

Figure 32:
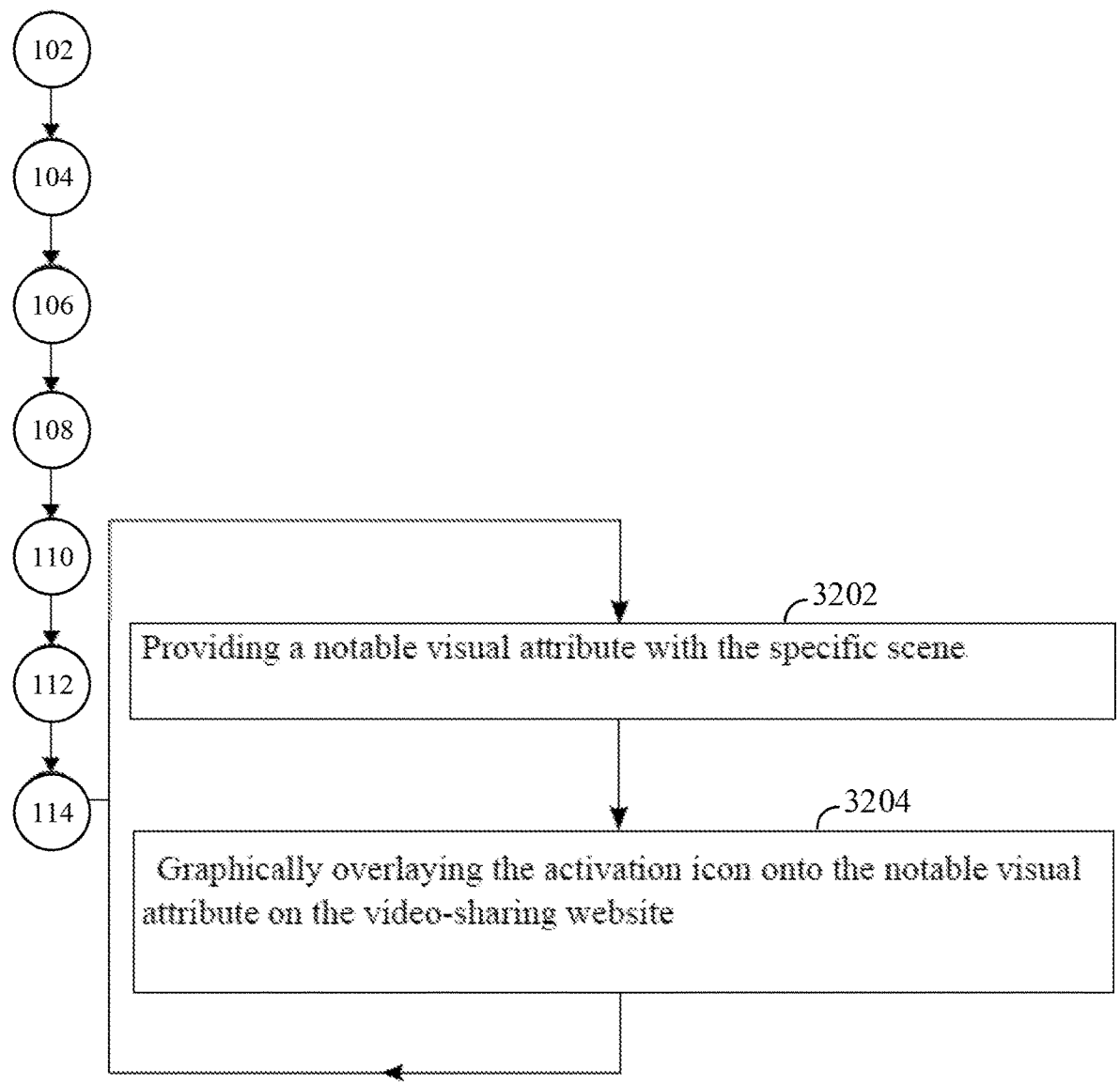

The flowchart of FIG. 32 illustrates processes for graphically overlaying the activation icon onto or near the notable visual attribute such as if the remote server pauses playback of the edited video file. In an example embodiment, the activation icon moves with the person, place, or thing displayed on the specific scene and thus, a notable visual attribute is provided with the specific scene (Step 3202). The notable visual attribute can be associated to the activation icon. For example, if the remote server pauses the edited video file at the specific scene, the video-sharing website graphically can overlay the activation icon onto the notable visual attribute on the video-sharing website during Step 114 (Step 3204). In some embodiments, the activation icon can be overlaid on top of the person, place, or thing presented by the image tile. For example, if multiple artists are on the specific scene, a respective activation icon can be positioned near each artist in the scene. This serves to clearly attribute an image tile to a person, place, or thing in the specific scene.

Figure 33:
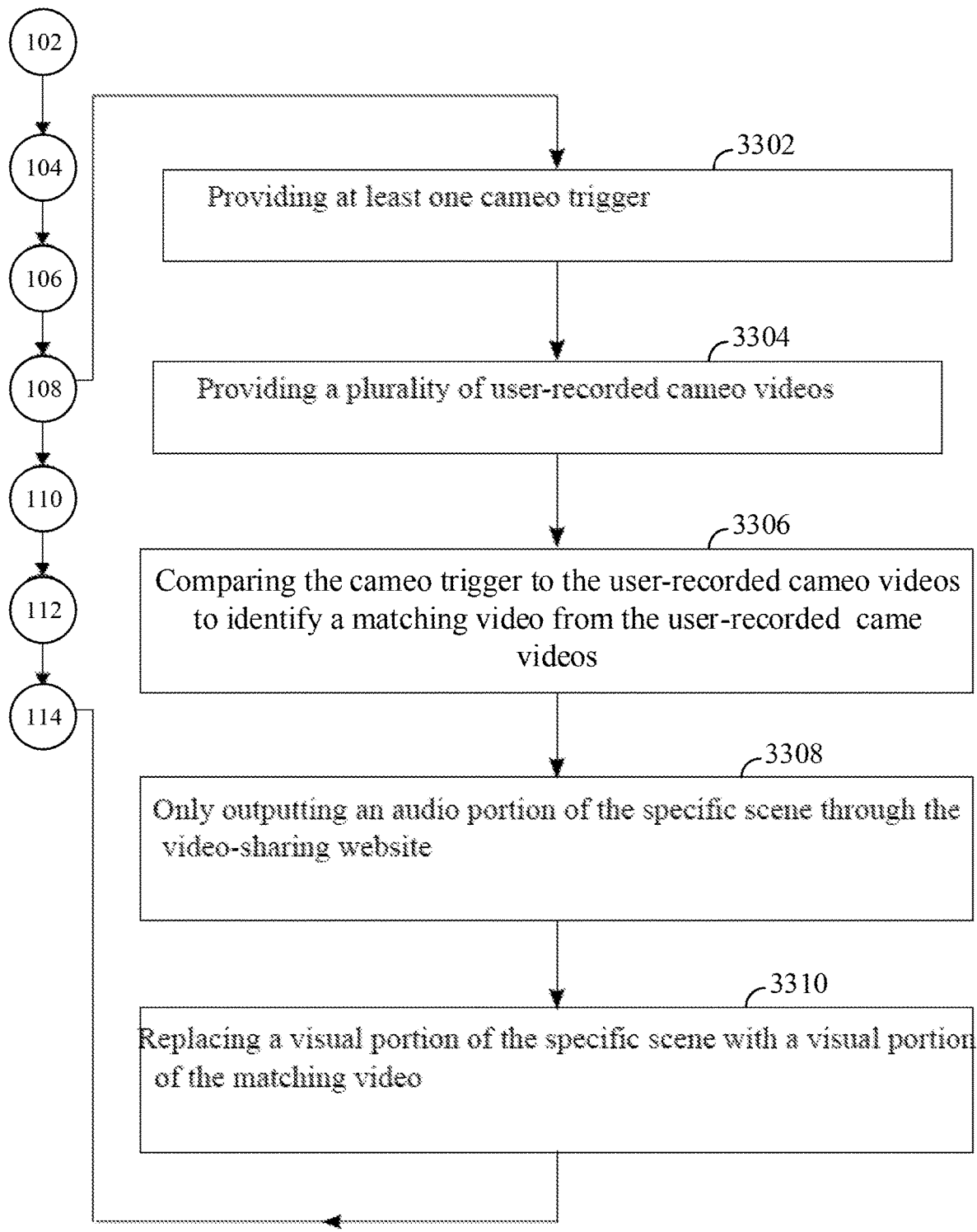

The flowchart of FIG. 33 illustrates processes for providing a cameo-trigger (i.e., a user interface element linked to a user-record video of a specific person of interest) and selecting a matching video from a set of user-recorded cameo videos (i.e., user-recorded videos with a specific person of interest) to play back with the edited video according to the link or another aspect of the cameo-trigger. The AV player-editor website also can personalize an edited video for the video feed of a user account, by stitching cameos of users singing or lip-synching into the edited video.

At least one cameo trigger can be provided as one of the at least one interactive feature (Step 3302). In an example, the at least one cameo trigger can be stitch-points allowing a cameo video to be stitched onto the edited video. The stitch-points can be designated in the authoring tool before the edited video is uploaded into the AV player-editor website. In one example, the cameo videos can be stitched onto edited videos that feature music. For example, cameo video features a AV player-editor user singing or lip-synching to a song. The cameo trigger can also refer to the specific music featured in the edited video.

Also, a plurality of user-recorded cameo videos stored on a device (such as stored on the remote server) can be provided (Step 3304). The plurality of user-recorded cameo videos can include user-description information. The AV player-editor website uses the user-description information to customize the edited video with the cameo. This can occur for each viewer. The user-description information can include the name of the song or music featured in the cameo video. Further, the user-description information can include the location, friends/followers, recorded preferences, viewing history of the user uploading the cameo video. The user-description information for the plurality of user-recoded cameo videos can be generated at the time of the uploading. A device (such as the remote server or the PC device) can then compare the cameo trigger to the user-description information for a video of the plurality of user-recorded cameo videos to identify at least one similar video from the plurality of user-recorded cameo videos (Step 3306). There are various ways of comparing the cameo-trigger to the user-description information. In some embodiments, the cameo trigger can be a stitch-point and a title of the music featured in the edited video. The at least one similar video can be a cameo video having the same song or music title as the cameo trigger. For example, if the user-description information lacks the song or music title, the AV player-editor uses song recognition technology to search through the plurality of user-recorded cameo videos and designate at least one similar video. Musical waveform data collected from the edited video allows the remote server to search and identify at least one similar video from the plurality of user-recorded cameo videos. As a result, when the user uploads an unrecognized cameo video, the remote server matches the cameo video with an edited video having the same waveform. Once the song in the user-recorded cameo video is recognized, EDL's and edits can be created based on the user's take length and where they have performed during the song.

In some embodiments, the user-description information is used to filter the plurality of user-recorded cameo videos before the at least one similar video is designated. This can be done by searching the plurality of user-recorded cameo videos for a specific tag such as a specific name, location, or event. For example, a user can be dancing at a night club and can upload a cameo of themselves singing and dancing along with the song that is being played at the nightclub. Before completing the upload, a user can tag another user at the nightclub, the name of the nightclub, and a possibly name of the event. A device (such as the remote server) can then designate the cameo videos having the same tags as similar videos.

Once the at least one similar video is identified, a device (such as the remote server) can customize a cameo video for a user account. This can be achieved by matching a user account to the most relevant cameo video. The device retrieves a viewer-description information with the device as the video-sharing website starts to play the specific scene.

The device then compares the viewer-description information to the user-description information of the similar video in order to identify a matching video from the at least one similar video. The viewer-description information can include the followers, location, viewing history, and favorite artists of the user account. The device compares the viewer-description information and the user-description information to identify a matching video. In an example, the device finds a matching video for an account of the plurality of user accounts by comparing a user profile associated with the account to the user tags featured in the cameo video. This can be done for each account of the plurality of accounts.

Once the matching video is identified, the user-recorded cameo video can be seamlessly stitched into the matching edited video. The video-sharing website only outputs an audio portion of the specific scene as the video-sharing website starts to play the specific scene (Step 3308). The device (such as the remote server) then replaces a visual portion of the specific scene with a visual portion of the matching video (Step 3310). The device, e.g., the remote server, can perform such actions as the video-sharing website starts to play the specific scene. The cameo video seamlessly starts playing as the edited video plays through the stitch points. This process can be repeated for the plurality of scenes in the edited video.

Although examples herein often refer to use and editing of a video and video file, such use and editing can also be applied to audio content, songs and audio files.

Figure 34:
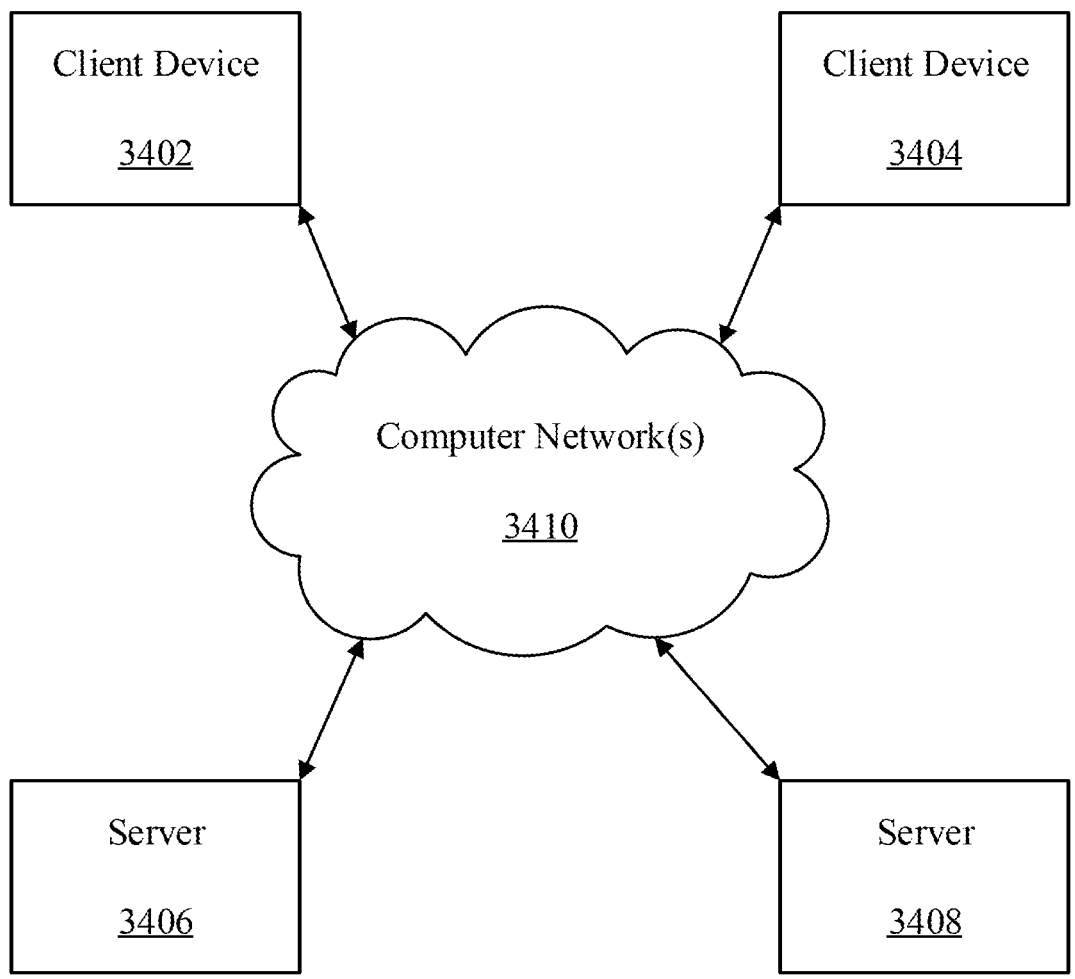
FIG. 34 is a schematic diagram illustrating an example of a network within which systems and methods disclosed herein can be implemented.

FIG. 34 is a schematic diagram illustrating an example of a network 3400 within which systems and methods disclosed herein can be implemented. As shown, the network 3400 of FIG. 34 includes client devices 3402 and 3404, servers 3406 and 3408, and one or more computer network(s) 3410. Any one of the client devices 3402 and 3404 and servers 3406 and 3408 can communicate with another one of the client devices and servers through the computer network(s) 3410. The client devices 3402 and 3404 and servers 3406 and 3408 can include one or more devices that includes a configuration to perform at least some of the operations of the processes and sub-processes illustrated in FIGS. 1, 2, 5, 7, 8, 12, 16-20, 22, 26, 30, 32, and 33.

Any one of the servers can include one or more computers that can run a service point which provides processing, data storage, or communication services. Any one of the servers can include one or more physical processors with associated communications and data storage capabilities. Also, any one of the servers can include operating software and one or more database systems and application software that support the services provided by the server. Servers can vary widely, but in general such devices can include one or more central processing units and memory. The servers 3406 and 3408 can provide a variety of services that include services that support the authoring tool, services that support displaying and playback of the outputted edited videos of the authoring tool, and in general, streaming and/or downloading media services, search services, photo services, web services, social networking services, news services, third-party services, audio services, video services, and messaging services. Such services can be provided via the servers 3406 and 3408 and can be secured such that a user is able to utilize such services upon the user being authenticated, verified or identified by the services. Examples of content described herein can include videos, text, audio, images, or the like, which can be processed in the form of physical signals, such as electrical signals, for example, or can be stored in memory, as physical states, for example. Also, although FIG. 34 illustrates servers 3406 and 3408 as single computing devices, respectively, the disclosure is not so limited. For example, one or more functions of a server can be distributed across one or more distinct computing devices. Moreover, in one embodiment, multiple servers can be integrated into a single computing device, without departing from the scope of the present disclosure. Also, either of the servers 3406 and 3408 can include and/or use a search engine and related technologies. The servers or the search engine can use a crawler and/or indexing as well as other search technologies.

Any one of the client devices 3402 and 3404 can be configured to send and receive signals such as through a wired transmission media or a wireless transmission media. A client device can, for example, can include a desktop computer, a portable device (such as a smart phone, a tablet computer, a laptop computer, or a wearable computer such as a smart watch), an Internet of Things (IoT) device (such as a vehicle or home appliance with embedded electronics, software, actuators, sensors, and interfaces to networks such as the Internet), or an integrated or distributed device combining various features described herein. The possible applications run by the client devices are many including applications distributed by the servers 3406 and 3408. The client devices can also include can also include client software applications enabling communication with other devices, such as communicating one or more messages, such as via a chat, posting, or email. The client devices can also include or execute an application to communicate and display content, such as, for example, text, static images, and original and edited video content. The client device can also include or execute an application to perform a variety of possible tasks, such as browsing, searching, playing, streaming or displaying various forms of content, including locally or remotely stored images, original video, and edited video. Client devices can vary, but generally such devices can include one or more central processing units and memory. Any one of the client devices 3402 and 3404 can be a mobile device, such a device that is small enough to be held and operated by one or two hands of a person. In some examples, a mobile device or another type of client device has a touchscreen interface with digitally derived buttons and keyboard or physical buttons along with a physical keyboard or keypad. A mobile device can connect to the Internet and interconnect with other devices such as an IoT device or another type of network connected device via Wi-Fi, Bluetooth, cellular networks or near field communication (NFC). Power can be provided to a mobile device by a battery or other wireless power source such a solar power source. Although FIG. 34 illustrates client devices 3402 and 3404 as single computing devices, respectively, the disclosure is not so limited. For example, one or more functions of a client device can be distributed across one or more distinct computing devices. Moreover, in one embodiment, multiple client devices can be integrated into a single computing device, without departing from the scope of the present disclosure.

The computer network(s) 3410 is a telecommunications network including one or more wired or wireless computer networks. A computer network within the computer network(s) 3410 can include nodes and data links between nodes. The data links can be established over a cable media such as wires or optic cables, or a wireless media such as through radio or light waves. The nodes can include a server, a client device, or a network device such as a firewall, gateway, hub, modem, multiplexer, network bridge, protocol converter, proxy server, router, switch, or other related hardware. The computer network(s) 3410 can include the Internet, a local area network (LAN), a wide area network (WAN), or a metropolitan area network (MAN)—also known as a middle area network—to connect computers in a geographic area larger than that covered by a LAN but smaller than the area covered by a WAN. Aspects of the network 3400, such as a node or a computer network of the computer network(s) 3410 can be implemented using a protocol used for communications over a telecommunications network. Communications over one of the networks can include signal formations (such as signal packets) communicated over a data link, and the communications can be controlled by a set of communications protocols such as the Internet protocol or TCP/IP suite.

With respect to FIG. 34, the foregoing is provided to illustrate that claimed subject matter is intended to include a wide range of possible features or capabilities. For instance, cloud computing, peer-to-peer networking, and various client-server configurations can be implemented through the network 3400. Also, a content delivery network or content distribution network (CDN) can be implemented through the network 3400. Also, in some embodiments, the method and systems can be utilized with or within a social networking website or platform.

Figure 35:
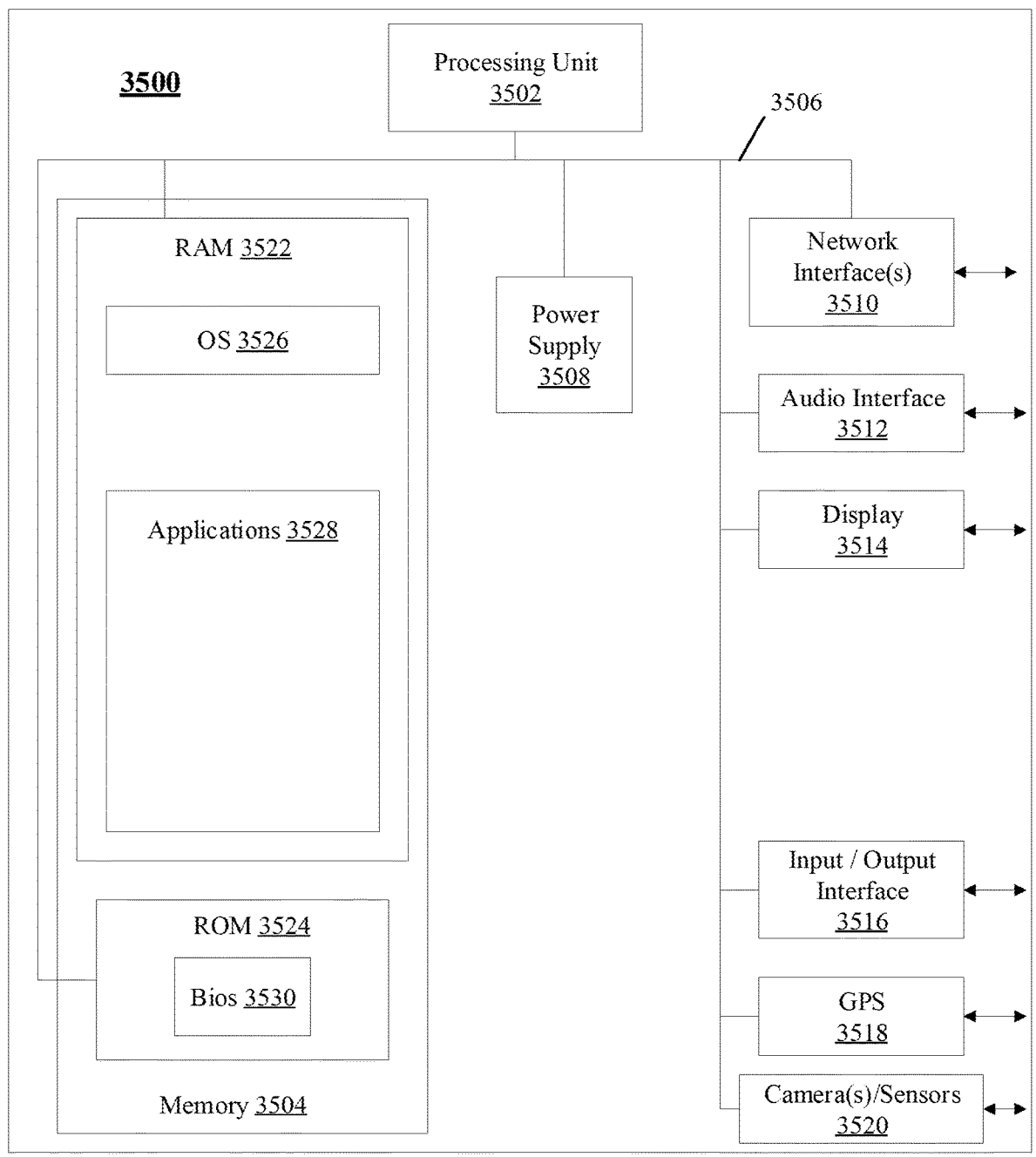
FIG. 35 is a schematic diagram illustrating an example of a computing device in accordance with some embodiments of the present disclosure.

FIG. 35 is a block diagram illustrating an internal architecture of an example of a computing device 3500 that can implement one or more of the client devices or servers of at least FIG. 34. The computing device 3500 can include a configuration to perform at least some of the operations described herein, such as operations performed in FIGS. 1, 2, 5, 7, 8, 12, 16-20, 22, 26, 30, 32, and 33 when implementing a client device or a server. Computing device 3500 can include many more or less components than those shown in FIG. 35. However, the components shown are sufficient to disclose an illustrative embodiment for implementing some aspects of a computing device such as a server or a client device.

As shown in the figure, device 3500 includes a processing unit 3502 (which can include one or more CPUs) in communication with a mass memory 3504 via a bus 3506. Computing device 3500 also includes a power supply 3508, one or more network interfaces 3510, an audio interface 3512, a display 3514 (such as a touchscreen), an input/output interface 3516, a global positioning system (GPS) receiver 3518 as well as one or more cameras or other types of sensors 3520. Network interface(s) 3510 can include circuitry for coupling device 3500 to one or more networks, and is constructed for use with one or more communication protocols and technologies as discussed above. Audio interface 3512 is arranged to produce and receive audio signals. Display 3514 can include any type of display used with a computing device. Display 3514 can also include a touch sensitive screen. The input/output interface 3516 can include a keypad or any other input device arranged to receive input from a user. The input/output interface 3516 can also implement communications with external devices, such as a headset, or other input or output devices such physical IoT devices. Input/output interface 3516 can utilize one or more communication technologies, such as USB, infrared, or Bluetooth™.

Mass memory 3504 includes a RAM 3522, a ROM 3524, and other storage means. Mass memory 3504 illustrates another example of computer storage media for storage of information such as computer readable instructions, data structures, program modules or other data. Mass memory 3504 stores a basic input/output system ("BIOS") 3530 for controlling low-level operation of device 3500. The mass memory also stores an operating system 3526 in RAM 3522 for controlling the operation of device 3500. Memory 3504 further includes one or more data stores, which can be utilized by device 3500 to store data in general, among other things, as well as the modules, data, and data structures described herein. For example, data stores can be employed to store information that describes various capabilities of device 3500. The information can then be provided to another device based on any of a variety of events, including being sent as part of a header during a communication, sent upon request, or the like. Applications 3528, such as provided by the servers 3406 and 3408 can include computer executable instructions which, when executed by device 3500, transmit, receive, or otherwise process audio, video, images, or enable communications with another computing device. Other examples of application programs or "apps" in some embodiments include browsers, calendars, contact managers, transcoders, photo and video management and editors, database programs, text processing programs, security applications, and search engines, for example.

FIG. 36 is a flowchart of another example method to implement embedding interactive content into a shareable online video in accordance with some embodiments of the present disclosure. Aspects of the method of FIG. 36 are combinable with aspects of the methods of FIGS. 1, 2, 5, 7, 8, 12, 16-20, 22, 26, 30, 32, and 33, and vice versa.

The method of FIG. 36 begins with Step 3602, with a computing device (such as the computing device 3500 of FIG. 35) providing an authoring tool. The authoring tool includes a graphical user interface (GUI). At Step 3604, the computing device inputs into the authoring tool an edit decision list (EDL) file and a video file. The video file includes a video. At Step 3606, the computing device provides the GUI of the authoring tool on a display. The GUI includes a view of a plurality of specific scenes of the video according to the inputted EDL file and the inputted video file. At Step 3608, the computing device provides, via the GUI of the authoring tool, a plurality of interactive features. At Step 3610, the computing device inputs, into the authoring tool, a selection of a scene of the plurality of specific scenes. At Step 3612, the computing device inputs, into the authoring tool, a selection of an interactive feature from the plurality of interactive features. At Step 3614, the computing device embeds, by the authoring tool, the selected interactive feature into the selected scene at a selected specific spatial location in the selected scene. At Step 3616, the computing device outputs the video file with the embedded interactive feature.

Although not depicted, in some embodiments, the method of FIG. 36 further includes the computing device providing user account information, managed by a remote server, with the providing of the authoring tool. The method can also include the computing device communicating the outputted video file with the embedded interactive feature to the remote server according to the user account information. The method can also include the computing device separating the inputted video file into the plurality of scenes according to the inputted EDL file. The method can also include the computing device inputting, by the authoring tool, a search query to a search engine; receiving, by the authoring tool, search results from the search engine according to the search query; and in response to receiving the search results, providing, via the GUI of the authoring tool, the plurality of interactive features which are based on the received search results. Also, in some embodiments, the plurality of interactive features can be stored in the computing device. The selected interactive feature can include a static content addendum graphic and an additional feature associated with the selected interactive feature selected from the group consisting of a brief description, a detailed description, a website link, and a related image. Also, the selected interactive feature can include a dynamic content addendum graphic and a visual transition that occurs upon activation of the selected interactive feature during playing of the video.

In the foregoing specification, embodiments of the disclosure have been described with reference to specific example embodiments thereof. It can be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method, comprising:
providing, via an authoring tool, a graphical user interface (GUI), wherein the GUI comprises a view of a plurality of scenes of a video;
providing, via the GUI, a view of a plurality of interactive features;
receiving, via the GUI, a selection of a scene of the plurality of scenes;
receiving, via the GUI, a selection of an interactive feature of the plurality of interactive features;
embedding directly, by the authoring tool, the selected interactive feature into the selected scene, such that a user controls placement of the selected interactive feature in the video directly via the authoring tool;
receiving, via the GUI, a selection of a frame of the selected scene at a selected spatial location in the selected frame; and
embedding directly, by the authoring tool, the selected interactive feature into the selected frame at the selected spatial location, such that a user controls a spatial and temporal placement of the selected interactive feature in the video directly via the authoring tool.

2. The method of claim 1, wherein the plurality of scenes is provided as a plurality of thumbnails in the GUI.

3. The method of claim 2, wherein a thumbnail of the plurality of thumbnails shows, via the GUI, a frame of a corresponding scene.

4. The method of claim 3, wherein a selection of the thumbnail of the plurality of thumbnails results in the authoring tool providing the corresponding scene via the GUI, allowing a user to scroll through the corresponding scene to one or more frames in the corresponding scene to embed a selected interactive feature in the one or more frames.

5. The method of claim 1, further comprising: outputting, via the authoring tool, the video with the embedded interactive feature.

6. The method of claim 5, further comprising:
providing user account information, managed by a remote server, with the providing of the GUI; and
communicating the outputted video with the embedded interactive feature to the remote server according to the user account information.

7. The method of claim 1, further comprising: separating the video into the plurality of scenes according to an EDL file.

8. The method of claim 1, further comprising:
receiving, via the GUI, a search query to a search engine;
receiving, by the authoring tool, search results from the search engine according to the search query; and in response to receiving the search results, providing, via the GUI, the plurality of interactive features which are based on the received search results.

9. A non-transitory computer readable storage medium comprising computer program instructions configured to instruct a computer processor to perform at least the steps of:
providing, via an authoring tool, a graphical user interface (GUI), wherein the GUI comprises a view of a plurality of scenes of a video;
providing, via the GUI, a view of a plurality of interactive features;
receiving, via the GUI, a selection of a scene of the plurality of scenes;
receiving, via the GUI, a selection of an interactive feature of the plurality of interactive features;
embedding directly, by the authoring tool, the selected interactive feature into the selected scene, such that a user controls placement of the selected interactive feature in the video directly via the authoring tool;
receiving, via the GUI, a selection of a frame of the selected scene at a selected spatial location in the selected frame; and
embedding directly, by the authoring tool, the selected interactive feature into the selected frame at the selected spatial location, such that a user controls a spatial and temporal placement of the selected interactive feature in the video directly via the authoring tool.

10. The non-transitory computer readable storage medium of claim 9, wherein the plurality of scenes is provided as a plurality of thumbnails in the GUI.

11. The non-transitory computer readable storage medium of claim 10, wherein a thumbnail of the plurality of thumbnails shows, via the GUI, a frame of a corresponding scene.

12. The non-transitory computer readable storage medium of claim 11, wherein a selection of the thumbnail of the plurality of thumbnails results in the authoring tool providing the corresponding scene via the GUI, allowing a user to scroll through the corresponding scene to one or more frames in the corresponding scene to embed a selected interactive feature in the one or more frames.

13. The non-transitory computer readable storage medium of claim 9, wherein the instructions are further configured to instruct the computer processor to further perform at least the steps of:
outputting, via the authoring tool, the video with the embedded interactive feature;
providing user account information, managed by a remote server, with the providing of the GUI; and
communicating the outputted video with the embedded interactive feature to the remote server according to the user account information.

14. The non-transitory computer readable storage medium of claim 9, wherein the instructions are further configured to instruct the computer processor to further perform at least the step of:
separating the video into the plurality of scenes according to an EDL file.

15. The non-transitory computer readable storage medium of claim 9, wherein the instructions are further configured to instruct the computer processor to further perform at least the steps of:
receiving, via the GUI, a search query to a search engine;
receiving, by the authoring tool, search results from the search engine according to the search query; and
in response to receiving the search results, providing, via the GUI, the plurality of interactive features which are based on the received search results.

16. A computing device comprising:
at least one processor; and
a storage medium tangibly storing thereon program logic configured to instruct the at least one processor to at least:
provide, via an authoring tool, a graphical user interface (GUI), wherein the GUI comprises a view of a plurality of scenes of a video;
provide, via the GUI, a view of a plurality of interactive features;
receive, via the GUI, a selection of a scene of the plurality of scenes;
receive, via the GUI, a selection of an interactive feature of the plurality of interactive features;
embed directly, by the authoring tool, the selected interactive feature into the selected scene, such that a user controls placement of the selected interactive feature in the video directly via the authoring tool;
receive, via the GUI, a selection of a frame of the selected scene at a selected spatial location in the selected frame; and
embed directly, by the authoring tool, the selected interactive feature into the selected frame at the selected spatial location, such that a user controls a spatial and temporal placement of the selected interactive feature in the video directly via the authoring tool.

17. The computing device of claim 16, wherein the plurality of scenes is provided as a plurality of thumbnails in the GUI.

18. The computing device of claim 17, wherein a thumbnail of the plurality of thumbnails shows, via the GUI, a frame of a corresponding scene.

19. The computing device of claim 18, wherein a selection of the thumbnail of the plurality of thumbnails results in the authoring tool providing the corresponding scene via the GUI, allowing a user to scroll through the corresponding scene to one or more frames in the corresponding scene to embed a selected interactive feature in the one or more frames.

20. The computing device of claim 16, wherein the program logic is configured to instruct the at least one processor to at least output, via the authoring tool, the video with the embedded interactive feature.

* * * * *